US008929914B2

(12) United States Patent
Davis

(10) Patent No.: US 8,929,914 B2
(45) Date of Patent: Jan. 6, 2015

(54) COMPENSATION OF PROPAGATION DELAYS OF WIRELESS SIGNALS

(71) Applicant: AT&T Mobility II LLC, Atlanta, GA (US)

(72) Inventor: Richard W. Davis, Seattle, WA (US)

(73) Assignee: AT&T Mobility II LLC, Atlanta, GA (US)

( * ) Notice: Subject to any disclaimer, the term of this patent is extended or adjusted under 35 U.S.C. 154(b) by 120 days.

(21) Appl. No.: 13/660,689

(22) Filed: Oct. 25, 2012

(65) Prior Publication Data

US 2013/0045755 A1     Feb. 21, 2013

Related U.S. Application Data

(63) Continuation of application No. 12/416,853, filed on Apr. 1, 2009, now Pat. No. 8,326,319.

(60) Provisional application No. 61/146,997, filed on Jan. 23, 2009.

(51) Int. Cl.
*H04W 64/00* (2009.01)
*H04W 56/00* (2009.01)
*H04W 4/02* (2009.01)

(52) U.S. Cl.
CPC .............. *H04W 56/006* (2013.01); *H04W 4/02* (2013.01)
USPC ................... 455/456.1; 455/456.2; 455/404.2

(58) Field of Classification Search
CPC ....... H04W 64/00; H04W 4/22; H04W 24/00; H04W 4/02
USPC .......... 455/404.2, 456.1, 456.5, 456.6, 67.11, 455/115.1
See application file for complete search history.

(56) References Cited

U.S. PATENT DOCUMENTS 5,515,062 A * 5/1996 Maine et al. .................. 342/457
(Continued)

FOREIGN PATENT DOCUMENTS

EP           0856746 A2      8/1998
(Continued)

OTHER PUBLICATIONS

3rd Generation Partnership Project, Technical Specification, "Group GSM/EDGE Radio Access Network, Radio subsystem synchronization (Release 8)", 3GPP TS 45.010 V8.0.0 (May 2008), last viewed Jul. 1, 2009, 30 pages.
(Continued)

*Primary Examiner* — Cong Tran
(74) *Attorney, Agent, or Firm* — Amin, Turocy & Watson, LLP

(57) ABSTRACT

Propagation delay offsets of wireless signals are compensated. Compensation is accomplished through determination of an effective wireless signal propagation delay that accounts for signal path delay and propagation delay over the air. Such determination is based at least in part on statistical analysis of accurate location estimates of reference positions throughout a coverage sector or cell, and location estimates of the reference positions generated through time-of-flight (TOF) measurements of wireless signals. Determination of propagation or signal path delay offset also is attained iteratively based at least in part on reference location estimates and TOF location estimates. High-accuracy location estimates such as those obtained through global navigation satellite systems are employed as reference location estimates. Position of probes or wireless beacons, deployed throughout a sector or cell, also are employed as reference locations. Compensation of propagation delay offset improves accuracy of conventional TOF location estimates and radio network performance.

20 Claims, 17 Drawing Sheets

(56) References Cited

U.S. PATENT DOCUMENTS

| | | |
|---|---|---|
| 5,724,660 A | 3/1998 | Kauser et al. |
| 5,732,354 A | 3/1998 | MacDonald |
| 5,732,383 A | 3/1998 | Foladare et al. |
| 5,844,521 A | 12/1998 | Stephens et al. |
| 5,982,324 A | 11/1999 | Watters et al. |
| 6,018,312 A | 1/2000 | Haworth et al. |
| 6,026,301 A | 2/2000 | Satarasinghe |
| 6,108,532 A | 8/2000 | Matsuda et al. |
| 6,108,556 A | 8/2000 | Ito |
| 6,148,219 A | 11/2000 | Engelbrecht et al. |
| 6,230,018 B1 | 5/2001 | Watters et al. |
| 6,256,577 B1 | 7/2001 | Graunke |
| 6,263,190 B1 | 7/2001 | Mamori et al. |
| 6,298,233 B1 | 10/2001 | Souissi et al. |
| 6,307,503 B1 | 10/2001 | Liu et al. |
| 6,311,078 B1 | 10/2001 | Hardouin et al. |
| 6,317,686 B1 | 11/2001 | Ran |
| 6,330,459 B1 | 12/2001 | Crichton et al. |
| 6,351,235 B1 | 2/2002 | Stilp |
| 6,353,778 B1 | 3/2002 | Brown et al. |
| 6,397,074 B1 | 5/2002 | Pihl et al. |
| 6,407,703 B1 | 6/2002 | Minter et al. |
| 6,429,815 B1 | 8/2002 | Soliman |
| 6,434,396 B1 | 8/2002 | Rune |
| 6,453,168 B1 | 9/2002 | McCrady et al. |
| 6,515,623 B2 | 2/2003 | Johnson |
| 6,522,296 B2 | 2/2003 | Holt |
| 6,526,335 B1 | 2/2003 | Treyz et al. |
| 6,560,532 B2 | 5/2003 | Cayford |
| 6,560,567 B1 | 5/2003 | Yechuri et al. |
| 6,594,576 B2 | 7/2003 | Fan et al. |
| 6,604,083 B1 | 8/2003 | Bailey et al. |
| 6,668,226 B2 | 12/2003 | Sutanto et al. |
| 6,690,292 B1 | 2/2004 | Meadows et al. |
| 6,744,383 B1 | 6/2004 | Alfred et al. |
| 6,744,740 B2 | 6/2004 | Chen |
| 6,757,545 B2 | 6/2004 | Nowak et al. |
| 6,801,782 B2 | 10/2004 | McCrady et al. |
| 6,801,855 B1 | 10/2004 | Walters et al. |
| 6,816,782 B1 | 11/2004 | Walters et al. |
| 6,892,054 B2 | 5/2005 | Belcher et al. |
| 6,933,100 B2 | 8/2005 | Igawa et al. |
| 6,933,860 B1 | 8/2005 | Gehman et al. |
| 7,065,349 B2 | 6/2006 | Nath et al. |
| 7,098,805 B2 | 8/2006 | Meadows et al. |
| 7,113,793 B2 | 9/2006 | Veerasamy et al. |
| 7,149,534 B2 | 12/2006 | Bloebaum et al. |
| 7,181,218 B2 | 2/2007 | Ovesjo et al. |
| 7,277,049 B2 | 10/2007 | Korneluk et al. |
| 7,289,039 B2 | 10/2007 | Kato et al. |
| 7,346,359 B2 | 3/2008 | Damarla et al. |
| 7,359,719 B1 | 4/2008 | Duffett-Smith et al. |
| 7,366,492 B1 | 4/2008 | Ganesh |
| 7,375,649 B2 | 5/2008 | Gueziec |
| 7,432,829 B2 | 10/2008 | Poltorak |
| 7,436,794 B2 | 10/2008 | Takahashi et al. |
| 7,508,321 B2 | 3/2009 | Gueziec |
| 7,664,492 B1 | 2/2010 | Lee et al. |
| 7,696,922 B2 | 4/2010 | Nicholson et al. |
| 7,697,917 B2 | 4/2010 | Camp et al. |
| 7,706,964 B2 | 4/2010 | Horvitz et al. |
| 7,744,740 B2 | 6/2010 | Diehl |
| 7,747,258 B2 | 6/2010 | Farmer et al. |
| 7,761,225 B2 | 7/2010 | Vaughn |
| 7,831,380 B2 | 11/2010 | Chapman et al. |
| 7,848,880 B2 | 12/2010 | Cheung |
| 7,890,299 B2 | 2/2011 | Fok et al. |
| 7,917,156 B2 | 3/2011 | Sheynblat et al. |
| 7,945,271 B1 | 5/2011 | Barnes et al. |
| 7,958,001 B2 | 6/2011 | Abbadessa et al. |
| 7,962,162 B2 | 6/2011 | McNair |
| 7,962,280 B2 | 6/2011 | Kindo et al. |
| 7,994,981 B1 | 8/2011 | Farrokhi et al. |
| 7,996,020 B1 | 8/2011 | Chhabra |
| 8,000,726 B2 | 8/2011 | Altman et al. |
| 8,005,050 B2 | 8/2011 | Scheinert et al. |
| 8,010,164 B1 | 8/2011 | Sennett et al. |
| 8,036,822 B2 | 10/2011 | Ho et al. |
| 8,054,802 B2 | 11/2011 | Burgess et al. |
| 8,121,604 B1 | 2/2012 | Schwinghammer |
| 8,140,079 B2 | 3/2012 | Olson |
| 8,193,984 B2 * | 6/2012 | Ward ............................ 342/387 |
| 8,194,589 B2 | 6/2012 | Wynn et al. |
| 8,195,175 B2 | 6/2012 | Govindan et al. |
| 8,224,349 B2 | 7/2012 | Meredith et al. |
| 8,253,559 B2 | 8/2012 | Howard et al. |
| 8,254,959 B2 | 8/2012 | Fix et al. |
| 8,264,956 B2 | 9/2012 | Ramankutty et al. |
| 8,270,933 B2 | 9/2012 | Riemer et al. |
| 8,280,438 B2 | 10/2012 | Barbera et al. |
| 8,295,854 B2 | 10/2012 | Osann et al. |
| 8,307,030 B1 | 11/2012 | Hu |
| 8,355,364 B1 | 1/2013 | Vargantwar et al. |
| 8,355,865 B2 | 1/2013 | Wagner et al. |
| 8,417,264 B1 | 4/2013 | Whitney et al. |
| 8,548,494 B2 | 10/2013 | Agarwal et al. |
| 8,594,700 B2 | 11/2013 | Nabbefeld |
| 8,666,388 B2 | 3/2014 | Catovic et al. |
| 8,666,390 B2 | 3/2014 | Meredith et al. |
| 2001/0047242 A1 | 11/2001 | Ohta |
| 2002/0059266 A1 | 5/2002 | I'anson et al. |
| 2002/0069312 A1 | 6/2002 | Jones |
| 2002/0077116 A1 | 6/2002 | Havinis et al. |
| 2002/0172223 A1 | 11/2002 | Stilp et al. |
| 2003/0092448 A1 | 5/2003 | Forstrom et al. |
| 2003/0097330 A1 | 5/2003 | Hillmer et al. |
| 2003/0115260 A1 | 6/2003 | Edge |
| 2003/0158924 A1 | 8/2003 | DeLegge |
| 2003/0222819 A1 | 12/2003 | Karr et al. |
| 2003/0225508 A9 | 12/2003 | Petzld et al. |
| 2004/0067759 A1 | 4/2004 | Spirito et al. |
| 2004/0082338 A1 | 4/2004 | Norrgard et al. |
| 2004/0127191 A1 | 7/2004 | Matsunaga |
| 2004/0131036 A1 | 7/2004 | Walsh |
| 2004/0155814 A1 | 8/2004 | Bascobert |
| 2004/0172190 A1 | 9/2004 | Tsunehara et al. |
| 2004/0219930 A1 | 11/2004 | Lin |
| 2004/0224698 A1 | 11/2004 | Yi et al. |
| 2005/0007993 A1 | 1/2005 | Chambers et al. |
| 2005/0039056 A1 | 2/2005 | Bagga et al. |
| 2005/0053099 A1 | 3/2005 | Spear et al. |
| 2005/0136911 A1 | 6/2005 | Csapo et al. |
| 2005/0239410 A1 | 10/2005 | Rochester |
| 2005/0272445 A1 | 12/2005 | Zellner et al. |
| 2005/0276385 A1 | 12/2005 | McCormick et al. |
| 2006/0030333 A1 | 2/2006 | Ward et al. |
| 2006/0046744 A1 | 3/2006 | Dublish et al. |
| 2006/0075131 A1 | 4/2006 | Douglas et al. |
| 2006/0089153 A1 | 4/2006 | Sheynblat |
| 2006/0240839 A1 | 10/2006 | Chen et al. |
| 2006/0267841 A1 | 11/2006 | Lee et al. |
| 2006/0270419 A1 | 11/2006 | Crowley et al. |
| 2006/0282660 A1 | 12/2006 | Varghese et al. |
| 2007/0001873 A1 | 1/2007 | Ishikawa et al. |
| 2007/0060130 A1 | 3/2007 | Gogic et al. |
| 2007/0176749 A1 | 8/2007 | Boyd |
| 2007/0213074 A1 | 9/2007 | Fitch et al. |
| 2007/0217375 A1 | 9/2007 | Zampiello et al. |
| 2007/0217379 A1 | 9/2007 | Fujiwara et al. |
| 2007/0293157 A1 | 12/2007 | Haartsen et al. |
| 2007/0298807 A1 | 12/2007 | Yarkosky |
| 2008/0004789 A1 | 1/2008 | Horvitz et al. |
| 2008/0010365 A1 | 1/2008 | Schneider |
| 2008/0039114 A1 | 2/2008 | Phatak et al. |
| 2008/0070593 A1 | 3/2008 | Altman et al. |
| 2008/0071466 A1 | 3/2008 | Downs et al. |
| 2008/0076450 A1 | 3/2008 | Nanda et al. |
| 2008/0096566 A1 | 4/2008 | Brunner et al. |
| 2008/0133730 A1 | 6/2008 | Park et al. |
| 2008/0186234 A1 | 8/2008 | Alles et al. |
| 2008/0192682 A1 | 8/2008 | Matsumoto et al. |
| 2008/0274750 A1 | 11/2008 | Carlson et al. |
| 2008/0299995 A1 | 12/2008 | Spain |
| 2008/0305832 A1 | 12/2008 | Greenberg |

(56) References Cited

U.S. PATENT DOCUMENTS

| | | |
|---|---|---|
| 2008/0311923 A1 | 12/2008 | Petrovic et al. |
| 2009/0024546 A1 | 1/2009 | Ficcaglia et al. |
| 2009/0052330 A1 | 2/2009 | Matsunaga et al. |
| 2009/0079622 A1 | 3/2009 | Seshadri et al. |
| 2009/0104917 A1 | 4/2009 | Ben Rached et al. |
| 2009/0117907 A1 | 5/2009 | Wigren |
| 2009/0131073 A1 | 5/2009 | Carlson et al. |
| 2009/0181695 A1 | 7/2009 | Wirola et al. |
| 2009/0260055 A1 | 10/2009 | Parmar |
| 2009/0280828 A1 | 11/2009 | Wang et al. |
| 2009/0286510 A1 | 11/2009 | Huber et al. |
| 2009/0287922 A1 | 11/2009 | Herwono et al. |
| 2009/0310501 A1 | 12/2009 | Catovic et al. |
| 2009/0327134 A1 | 12/2009 | Carlson et al. |
| 2010/0020776 A1 | 1/2010 | Youssef et al. |
| 2010/0054237 A1 | 3/2010 | Han et al. |
| 2010/0058442 A1 | 3/2010 | Costa et al. |
| 2010/0081389 A1 | 4/2010 | Lawrow |
| 2010/0100732 A1 | 4/2010 | Hatakeyama et al. |
| 2010/0113035 A1 | 5/2010 | Eskicioglu et al. |
| 2010/0120447 A1 | 5/2010 | Anderson et al. |
| 2010/0124931 A1 | 5/2010 | Eskicioglu et al. |
| 2010/0135178 A1 | 6/2010 | Aggarwal et al. |
| 2010/0144368 A1 | 6/2010 | Sullivan |
| 2010/0159951 A1 | 6/2010 | Shkedi |
| 2010/0172259 A1 | 7/2010 | Aggarwal et al. |
| 2010/0189236 A1 | 7/2010 | MacDonald et al. |
| 2010/0190509 A1 | 7/2010 | Davis |
| 2010/0195566 A1 | 8/2010 | Krishnamurthy et al. |
| 2010/0203903 A1 | 8/2010 | Dingler et al. |
| 2010/0207470 A1 | 8/2010 | Kim et al. |
| 2010/0220665 A1 | 9/2010 | Govindan et al. |
| 2010/0222075 A1 | 9/2010 | Miura |
| 2010/0227589 A1 | 9/2010 | Cook et al. |
| 2010/0250542 A1 | 9/2010 | Fujimaki |
| 2010/0299060 A1 | 11/2010 | Snavely et al. |
| 2010/0311437 A1 | 12/2010 | Palanki et al. |
| 2010/0313157 A1 | 12/2010 | Carlsson et al. |
| 2011/0009068 A1 | 1/2011 | Miura |
| 2011/0010085 A1 | 1/2011 | Tanaka et al. |
| 2011/0023129 A1 | 1/2011 | Vernal |
| 2011/0053609 A1 | 3/2011 | Grogan et al. |
| 2011/0060808 A1 | 3/2011 | Martin et al. |
| 2011/0065450 A1 | 3/2011 | Kazmi |
| 2011/0072034 A1 | 3/2011 | Sly |
| 2011/0076975 A1 | 3/2011 | Kim et al. |
| 2011/0077032 A1 | 3/2011 | Correale et al. |
| 2011/0161261 A1 | 6/2011 | Wu et al. |
| 2011/0164596 A1 | 7/2011 | Montemurro et al. |
| 2011/0171912 A1 | 7/2011 | Beck et al. |
| 2011/0172905 A1 | 7/2011 | Schroder et al. |
| 2011/0205964 A1 | 8/2011 | Fix et al. |
| 2011/0207470 A1 | 8/2011 | Meredith et al. |
| 2011/0210843 A1 | 9/2011 | Kummetz et al. |
| 2011/0210849 A1 | 9/2011 | Howard et al. |
| 2011/0244879 A1 | 10/2011 | Siomina et al. |
| 2011/0256874 A1 | 10/2011 | Hayama et al. |
| 2011/0271331 A1 | 11/2011 | Adams |
| 2011/0296169 A1 | 12/2011 | Palmer |
| 2011/0319098 A1 | 12/2011 | Potorny et al. |
| 2012/0016902 A1 | 1/2012 | Ranjan et al. |
| 2012/0025976 A1 | 2/2012 | Richey et al. |
| 2012/0028650 A1 | 2/2012 | Cooper et al. |
| 2012/0030083 A1 | 2/2012 | Newman et al. |
| 2012/0052884 A1 | 3/2012 | Bogatin |
| 2012/0062415 A1 | 3/2012 | Hwang et al. |
| 2012/0087338 A1 | 4/2012 | Brandt et al. |
| 2012/0139782 A1 | 6/2012 | Gutt et al. |
| 2012/0158289 A1 | 6/2012 | Bernheim Brush et al. |
| 2012/0182874 A1 | 7/2012 | Siomina et al. |
| 2012/0287911 A1 | 11/2012 | Takano et al. |
| 2012/0317500 A1 | 12/2012 | Kosseifi et al. |
| 2012/0323703 A1 | 12/2012 | Hillier |
| 2013/0007058 A1 | 1/2013 | Meredith et al. |
| 2013/0023237 A1 | 1/2013 | Meredith et al. |
| 2013/0023274 A1 | 1/2013 | Meredith et al. |
| 2013/0023281 A1 | 1/2013 | Meredith et al. |
| 2013/0281111 A1 | 10/2013 | Syrjarinne et al. |
| 2013/0324149 A1 | 12/2013 | Fix et al. |
| 2014/0062782 A1 | 3/2014 | Abraham |
| 2014/0171060 A1 | 6/2014 | Cook et al. |

FOREIGN PATENT DOCUMENTS

| | | |
|---|---|---|
| JP | 2004069609 | 3/2004 |
| JP | 2007328050 A | 12/2007 |
| WO | 2006031035 A1 | 3/2006 |

OTHER PUBLICATIONS

3rd Generation Partnership Project, Technical Specification, "Group Radio Access Network, UTRAN Iuh interface Node B Application Part (NBAP) signalling (Release 8)", 3GPP TS 25.469 V8.0.0 (Dec. 2008), last viewed Jul. 1, 2009, 56 pages.

Sullivan, Mark. "Signs and Wonders: Is At&T Stepping Up Its Game?" PC World, Dec. 10, 2009, 1 page.

ETSI TS 125 215 V6.4.0 (Sep. 2005). Universal Mobile Telecommunications System (UMTS), Physical layer, Measurements (FDD), 3GPP TS 25.215 version 6.4.0 Release 6). Last accessed Jun. 18, 2010, 20 pages.

ETSI TS 125 331 V6.9.0 (Mar. 2006). Universal Mobile Telecommunications System (UMTS), Radio Resource Control (RRC) protocol specification, (3GPP TS 25.331 version 6.9.0 Release 6). Last accessed Jun. 18, 2010, 1211 pages.

New Devices Aim to Disable Cell Phones While Driving. FOXNews.com, Jan. 18, 2009. http://www.foxnews.com/printer_friendly_story/0,3566,480585,00.html. Last accessed Nov. 24, 2010, 2 pages.

Cortes, et al. "Support-Vector Networks", Machine Learning, 20, 1995. http://www.springerlink.com/content/k238jx04hm87j80g/fulltext.pdf. Last accessed Dec. 24, 2010, 25 pages.

ACM Website, Press release of Mar. 17, 2009. http://www.acm.org/press-room/news-releases/pdfs/awards-08-groupa1.pdf. Last accessed Dec. 24, 2010, 3 pages.

"Boser, et al. A training algorithm for optimal margin classifiers. In D. Haussler, editor, 5th Annual ACM Workshop on COLT, pp. 144-152, Pittsburgh, PA, 1992. ACM Press.http://citeseerx.ist.psu.edu/viewdoc/summary?doi=10.1.1.21.3818. Last accessed Dec. 24, 2010, 9 pages.".

"Hsu, et al. A Practical Guide to Support Vector Classification. Department of Computer Science National Taiwan University, Last updated: Apr. 15, 2010.http://www.csie.ntu.edu.tw/~cjlin/papers/guide/guide.pdf. Last accessed Dec. 24, 2010, 16 pages.".

"Drucker, et al. Support Vector Regression Machines.http://scholar.google.com/scholar?q=%22Support+Vector+Regression+Machines.%22. Last accessed Dec. 24, 2010, 7 pages."

Suykens et al., "Least squares support vector machine classifiers", Neural Processing Letters, vol. 9, No. 3, Jun. 1999, pp. 293-300.

Ferris et al. (2002). "Interior-point methods for massive support vector machines". SIAM Journal on Optimization 13: 783-804. doi:10.1137/S1052623400374379.

Meyer et al. "The support vector machine under test." Neurocomputing 55(1-2): 169-186, 2003.

International Search Report for PCT Application No. US2011/026122 Sep. 10, 2011, 11 pages.

International Search Report for PCT Application No. US2011/026120 dated Sep. 9, 2011 13 pages.

Charitanetra et al. "Mobile positioning location using E-OTD method for GSM network" Research and Development, 2003. Proceedings Student Conference on Putrajaya, Malaysia Aug. 25-26, 2003, pp. 319-324.

"Location Labs Powers Location-based Fraud Detection", All Points Blog, http://webcache.googleusercontent.com/search?hl=en&rlz=1R2GFRE_enUS398&q=cache:trsMn9Sin6wJ:http://apb.directionsmag.com/entry/location-labs-powers-location-based-fraud-detection/162802+http%3A//apb.directionsmag.com/entry/location-labs-powers-location-based- . . . 1&ct=clnk, Oct. 12, 2010.

(56) References Cited

OTHER PUBLICATIONS

"Location Based Fraud Detection", Finsphere Corporation, 2008-2010.
Fleishman. Using the Personal Hotspot on your AT & T iPhone. Published online Mar. 15, 2011. http://www.macworld.com/article/158556/2011/03/personal_hotspot_att . . . , 4 pages.
Fleischfresser. Never Stop at a Red-Light Again. Published online Aug. 30, 2011. http://www.smartplanet.com/blog/ . . . , 2 pages.
Cellphone Networks and the Future of Traffic. Published online Mar. 2, 2011. http://m.wired.com/autopia/2011/03/cell-phone-networks-and-the-future- . . . 15 pages.
Intelligent Transportation System. Published online http://en.wikipedia.org/wiki/Intelligent_transportation_system, 7 pages.
Koukoumidis Emmanouil, Peh Li-Shiuan, Martonosi Margaret, SignalGuru: Leveraging Mobile Phones for Collaborative Traffic Signal Schedule Advisory. 14 pages.
Bitcarrier Technology. Published online at http://www.bitcarrier.com/technology. 1 page.
Hao Peng, Ban Xuegang(Jeff). Estimating Vehicle Position in a Queue at Signalized Intersections Using Simple Travel Times from Mobile Sensors. 6 pages.
Ban Xuegang(Jeff), Gruteser Marco. Mobile Sensor as Traffic Probes: Addressing Transportation Modeling and Privacy Protection in an Integrated Framework. Dated Jan. 10, 2010. 17 pages.
Office Action dated Dec. 28, 2011 for U.S. Appl. No. 12/836,471, 34 pages.
Office Action dated Feb. 23, 2012 for U.S. Appl. No. 12/967,747, 31 pages.
Office Action dated Dec. 15, 2011 for U.S. Appl. No. 12/712,424, 34 pages.
OA dated Apr. 13, 2012 for U.S. Appl. No. 12/416,853, 36 pages.
OA dated Oct. 2, 2012 for U.S. Appl. No. 13/554,285, 19 pages.
OA dated Aug. 30, 2012 for U.S. Appl. No. 12/958,146, 40 pages.
MobileLutions Introduces MobiLoc-A Breakthrough Technology to Control Texting in the Mobile Workplace. Press release Oct. 10, 2010 by MobileLutions. 2 pages.
DriveAssist Frequently Ask question by Aegis Mobility, Wayback archive Jul. 12, 2010, 2 pages.
OA dated Jul. 30, 2012 for U.S. Appl. No. 12/967,747, 28 pages.
OA dated Jul. 17, 2012 for U.S. Appl. No. 13/220,083, 57 pages.
OA dated Sep. 11, 2012 for U.S. Appl. No. 13/188,345, 44 pages.
OA dated Oct. 15, 2012 for U.S. Appl. No. 13/523,778, 21 pages.
OA dated Dec. 20, 2012 for U.S. Appl. No. 12/958,146, 23 pages.
OA dated Dec. 28, 2012 for U.S. Appl. No. 13/188,295, 37 pages.
OA dated Jan. 3, 2013 for U.S. Appl. No. 13/188,300, 36 pages.
OA dated Nov. 8, 2012 for U.S. Appl. No. 13/204,535, 30 pages.
Notice of Allowance mailed Aug. 12, 2013, for U.S. Appl. No. 13/174,541, 40 pages.
Final Office Action dated Aug. 2, 2013, for U.S. Appl. No. 13/188,295, 26 pages.
Final Office Action dated Aug. 2, 2013, for U.S. Appl. No. 13/188,300, 38 pages.
Non-Final Office Action dated Jun. 20, 2013, for U.S. Appl. No. 13/219,911, 61 pages.
Non-Final Office Action dated Jul. 17, 2013, for U.S. Appl. No. 13/188,345, 27 pages.
Non-Final Office Action dated Jun. 20, 2013, for U.S. Appl. No. 13/291,917, 52 pages.
Non-Final Office Action dated May 31, 2013, for U.S. Appl. No. 13/523,770, 40 pages.
Non-Final Office Action dated Sep. 19, 2013, for U.S. Appl. No. 13/927,020, 30 pages.
Non-Final Office Action dated Oct. 2, 2013 for U.S. Appl. No. 12/958,146, 31 pages.
Non-Final Office Action dated Sep. 26, 2013 for U.S. Appl. No. 13/284,456, 58 pages.
RouteFinder 3.00 for ArGIS Documentation, © 2007 Routeware and Higher Mapping Solutions, 71 pages, downloaded from http://www.routeware.dk/download/routefinder_arcgis.pdf.

mySociety (Web page), "More travel-time maps and their uses", 2007, downloaded from http://www.mySociety.org/2007/more-travel-maps/, 10 pages total (including a single page Examiner's attachment showing the operation of the interactive travel-time map). Wayback machine archive from Jan. 21, 2009 of the mySociety Web page, "More travel-time maps and their uses", downloaded from http://web.archive.org/web/20090121193615/http://www.mysociety.org/2007/more-travel-maps/, 11 pages.
Street, Nicholas, "TimeContours: Using isochrone visualisation to describe transport network travel cost", Final Report, Jun. 14, 2006, Department of Computing Imperial College London, 97 pages. Downloaded from http://www.doc.ic.ac.uk/teaching/projects/Distinguished06/nicholasstreet.pdf.
Non-Final Office Action dated Nov. 5, 2013 for U.S. Appl. No. 13/188,136, 47 pages.
Final Office Action dated Sep. 18, 2013, for U.S. Appl. No. 13/284,497, 30 pages.
Final Office Action dated Aug. 22, 2013, for U.S. Appl. No. 13/277,595, 36 pages.
Final Office Action dated Oct. 21, 2013, for U.S. Appl. No. 13/523,770, 24 pages.
Office Action dated Nov. 5, 2013 for U.S. Appl. No. 13/188,345, 30 pages.
Office Action dated Mar. 25, 2014 for U.S. Appl. No. 13/488,144, 60 Pages.
Interview Summary dated Feb. 3, 2014 for U.S. Appl. No. 13/188,136, 10 pages.
Rabinowitz, et al., A new positioning system using television synchronization signals, IEEE Transactions on Broadcasting, vol. 51(1), p. 51-61, Mar. 2005.
Final Office Action dated Apr. 3, 2014 for U.S. Appl. No. 13/188,295, 37 pages.
Final Office Action dated Jan. 25, 2013, for U.S. Appl. No. 13/554,285, 20 pages.
Non-Final Office Action dated Mar. 19, 2013, for U.S. Appl. No. 13/174,541, 46 pages.
Final Office Action dated Feb. 13, 2013, for U.S. Appl. No. 13/220,083, 48 pages.
Final Office Action dated Feb. 22, 2013, for U.S. Appl. No. 13/188,345, 45 pages.
Final Office Action dated Mar. 15, 2013, for U.S. Appl. No. 13/204,535, 48 pages.
Non-Final Office Action dated Mar. 19, 2013, for U.S. Appl. No. 13/284,497, 46 pages.
Non-Final Office Action dated Apr. 19, 2013, for U.S. Appl. No. 13/277,595, 58 pages.
Marko Silventoinen, et al., "Mobile Station Locating in GSM" Helsinki, Finland, Last accessed on Nov. 15, 2011, 7 pages.
Office Action dated Dec. 30, 2013 for U.S. Appl. No. 13/305,267, 10 pages.
Office Action dated May 21, 2013 for U.S. Appl. No. 13/305,276, 28 pages.
Office Action dated Oct. 24, 2012 for U.S. Appl. No. 13/305,276, 37 pages.
"Locate your friends in real time with Google Latitude." http://googlemobile.blogspot.com/2009/02/locate-your-friends-in-real-time-with.html. Last accessed Mar. 8, 2012, 23 pages.
"Location sharing and updating." http://support.google.com/mobile/bin/answer.py?hl=en&answer=136647. Last accessed Mar. 8, 2012, 3 pages.
"Privacy Settings." http://support.google.com/mobile/bin/answer.py?hl=en&answer=136650, Last accessed Mar. 8, 2012, 1 page.
Office Action dated Nov. 25, 2013 for U.S. Appl. No. 13/447,069, 40 pages.
Office Action dated May 9, 2013 for U.S. Appl. No. 13/447,069, 33 pages.
Tsai, et al, "Location-Sharing Technologies: Privacy Risks and Controls." Feb. 2010. Retrieved on May 10, 2013, 26 pages.
Li et al, "Sharing Location in Online Social Networks". IEEE Network, Sep./Oct. 2010; 0890-8044/10/$25.00 (c)2010 IEEE. Retrieved on May 10, 2013, 6 pages.

(56) References Cited

OTHER PUBLICATIONS

Tsai, et al, "Who's Viewed You? The Impact of Feedback in a Mobile Location-Sharing Application". CHI 2009—Security and Privacy, Apr. 9, 2009—Boston, MA, USA. Retrieved on May 10, 2013, 10 pages.

Pettersen, et al., "Automatic antenna tilt control for capacity enhancement in UMTS FDD." Retrieved on Mar. 25, 2012, 5 pages.

Islam, et al., "Self-Optimization of Antenna Tilt and Pilot Power for Dedicated Channels." Retrieved on Mar. 25, 2012, 8 pages.

Bigham, et al., "Tilting and Beam-shaping for Traffic Load Balancing in WCDMA Network." Retrieved on Mar. 25, 2012, 4 pages.

3GPP TS 25.215 V6.4.0 (Sep. 2005) Physical Layer Measurements.

3GPP TS 25.331 V6.9.0 (Mar. 2006) RRC protocol for the UE-UTRAN radio interface.

3GPP TS 25.413 V6.9.0 (Mar. 2006) UTRAN lu interface RANAP signalling.

Calabrese, et al., "Real-Time Urban Monitoring Using Cell Phones: A Case Study in Rome". IEEE Transactions on Intelligent Transportation Systems, 12 pages. (http://senseable.mit.edu/papers/pdf/2010_Calabrese_et_al_Rome_TITS.pdf). Retrieved on Sep. 29, 2012, 11 pages.

Smith, et al., "Airsage Overview", (http://mikeontraffic.typepad.com/files/raleigh-winter-2011-presentation-v11-final.pdf) Retrieved on Sep. 29, 2012, 39 pages.

Office Action dated Feb. 5, 2014 for U.S. Appl. No. 13/526,988, 56 pages.

Non-Final Office Action dated Dec. 11, 2013, for U.S. Appl. No. 13/188,295, 52 pages.

Non-Final Office Action dated Dec. 24, 2013, for U.S. Appl. No. 13/188,300, 44 pages.

Final Office Action dated Dec. 11, 2013, for U.S. Appl. No. 13/291,917, 34 pages.

Final Office Action dated Jan. 15, 2014 for U.S. Appl. No. 13/219,911, 38 pages.

Final Office Action dated Jan. 28, 2014, for U.S. Appl. No. 12/958,146, 24 pages.

Notice of Allowance dated Feb. 14, 2014 for U.S. Appl. No. 13/284,456, 30 pages.

Final Office Action dated Feb. 24, 2014, for U.S. Appl. No. 13/927,020, 18 pages.

Office Action dated Apr. 8, 2014 for U.S. Appl. No. 13/175,199, 52 Pages.

Office Action dated Apr. 23, 2014 for U.S. Appl. No. 13/291,917, 29 Pages.

Office Action dated Apr. 22, 2014 for U.S. Appl. No. 13/447,069, 51 Pages.

Office Action dated Sep. 20, 2012 for U.S. Appl. No. 12/870,254, 29 pages.

Non-Final Office Action dated Jun. 6, 2014 for U.S. Appl. No. 13/447,072, 25 pages.

Office Action dated May 9, 2014 for U.S. Appl. No. 13/188,136, 33 pages.

Squires, "Practical Physics", Cambridge University Press, p. 12, 1986, 3 pages.

Represent (2000). In Collins English dictionary. Retrieved from http://search.credoreference.com/content/entry/hcengdict/represent/0, 2 pages.

Represent. (2001). In Chambers 21 st century dictionary. Retrieved from http://search.credoreference.com/content/entry/chambdict/represent/0.

Represent. (2011). In the american heritage dictionary of the english language. Retrieved from http://search.credoreference.com/content/entry/hmdictenglang/represent/0.

Non-Final Office Action dated May 20, 2014 for U.S. Appl. No. 13/551,369, 29 pages.

Non-Final Office Action dated May 30, 2014 for U.S. Appl. No. 13/277,595, 49 pages.

Non-Final Office Action dated Jun. 3, 2014 for U.S. Appl. No. 13/523,770, 53 pages.

Office Action dated Jun. 18, 2014 for U.S. Appl. No. 13/305,276, 26 Pages.

Office Action dated Jun. 26, 2014 for U.S. Appl. No. 13/557,425, 24 Pages.

Office Action dated Jun. 30, 2014 for U.S. Appl. No. 13/305,267, 44 Pages.

Office Action dated Jul. 22, 2014 for U.S. Appl. No. 12/958,146, 38 Pages.

Notice of Allowance dated Jul. 22, 2014 for U.S. Appl. No. 13/525,065, 82 Pages.

Notice of Allowance dated Jul. 7, 2014 for U.S. Appl. No. 13/188,295, 51 pages.

Notice of Allowance dated Jul. 22, 2014 for U.S. Appl. No. 13/188,300, 49 Pages.

Office Action dated Aug. 8, 2014 for U.S. Appl. No. 13/284,497, 48 pages.

Office Action dated Aug. 11, 2014 for U.S. Appl. No. 14/279,176, 22 pages.

Notice of Allowance dated Aug. 21, 2014 for U.S. Appl. No. 13/447,069, 78 pages.

Office Action dated Aug. 28, 2014 for U.S. Appl. No. 13/526,988, 83 pages.

Office Action dated Sep. 22, 2014 for U.S. Appl. No. 13/175,199, 62 pages.

Office Action dated Oct. 17, 2014 for U.S. Appl. No. 13/204,535, 47 pages.

Office Action dated Oct. 20, 2014 for U.S. Appl. No. 13/494,959, 64 pages.

Office Action dated Oct. 22, 2014 for U.S. Appl. No. 13/557,425, 59 pages.

\* cited by examiner

COMPENSATION OF PROPAGATION DELAYS OF WIRELESS SIGNALS

CROSS-REFERENCE TO RELATED APPLICATIONS

This patent application is a continuation of U.S. patent application Ser. No. 12/416,853, filed on Apr. 1, 2009, entitled "COMPENSATION of PROPAGATION DELAYS OF WIRELESS SIGNALS," which claims the benefit of U.S. Provisional Patent Application No. 61/146,997, filed on Jan. 23, 2009, entitled "COMPENSATION OF PROPAGATION DELAYS OF WIRELESS SIGNALS." The entireties of each of these patent applications are incorporated herein by reference.

TECHNICAL FIELD

The subject innovation relates to wireless communications and, more particularly, to correction of propagation delay offsets of wireless signals.

BACKGROUND

In mobile networks, timing delay of the signals transmitted between the wireless base station and the wireless handset are employed in various location services methods, including, but not limited to, cell global identity and timing advance (CGI+TA), CGI and round trip time (CGI+RTT), time of arrival (TOA), and custom methods. Timing delay is affected by propagation delay in the wireless signal path among radio component(s) at the wireless base station and a sector antenna. Wireless signal path propagation delay can arise from various mismatches (e.g., impedance mismatch) among electronic elements and components, stray capacitances and inductances, length of the antenna(s) cable(s) in base station(s); tower height of base station, any signal path scattering, or "signal bounces," such as multipath or strong reflections, etc.; and the like. While propagation delay is typically assumed negligible with respect to timing delay, depending on the architecture of the serving base station and covered sector antenna(s) signal propagation delay can be substantive, particularly in distributed antenna systems and low-power wireless radio cells. Thus, utility of timing delay, or time-of-flight, data to provide estimates of a served mobile device location(s) can be substantially diminished.

DETAILED DESCRIPTION

Figure 1A:
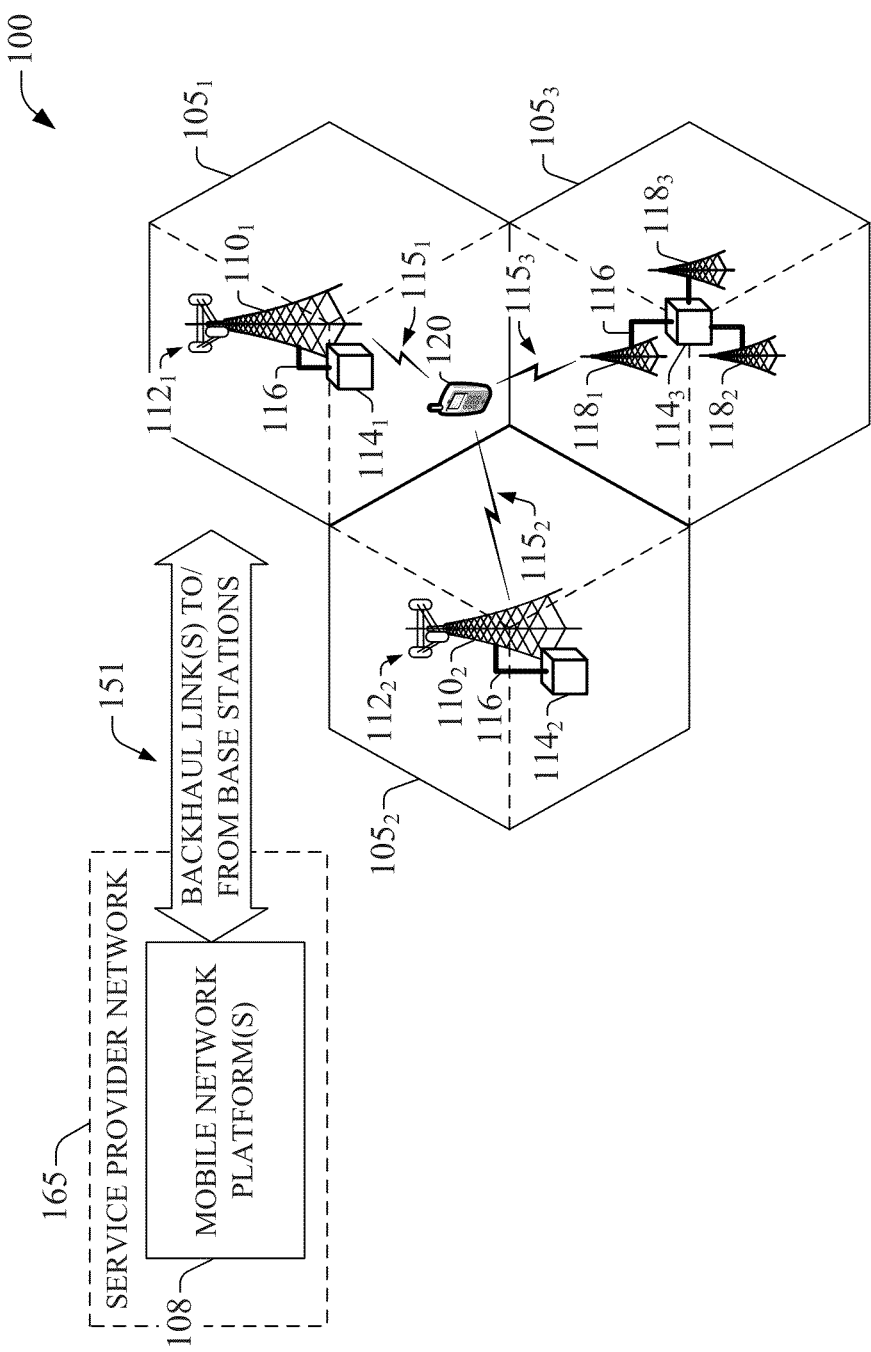
FIGS. 1A-1B illustrate, respectively, a schematic example wireless environment that can operate in accordance with aspects described herein, and a diagram of timing propagation structure including delays that are compensated, at least in part, in accordance with aspects of the subject innovation.

The subject innovation is now described with reference to the drawings, wherein like reference numerals are used to refer to like elements throughout. In the following description, for purposes of explanation, numerous specific details are set forth in order to provide a thorough understanding of the subject innovation. It may be evident, however, that the subject innovation may be practiced without these specific details. In other instances, well-known structures and devices are shown in block diagram form in order to facilitate describing the subject innovation.

As used in this application, the terms "component," "system," "platform," "node," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration, both an application running on a server and the server can be a component. One or more components may reside within a process and/or thread of execution and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "Node B," "evolved Node B (eNode B)," "home Node B (HNB)," "home access point (HAP)," and the like, are utilized interchangeably in the subject application, and refer to a wireless network component or appliance that serves and receives data, control, voice, video, sound, gaming, or substantially any data-stream or signaling-stream from a set of subscriber stations. Data and signaling streams can be packetized or frame-based flows.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components supported through artificial intelligence (e.g., a capacity to make inference based on complex mathematical formalisms) which can provide simulated vision, sound recognition and so forth.

The subject innovation provides system(s) and method(s) for compensation of propagation delays of wireless signals. Wireless signals can be radio frequency signals, microwave signals, or any other electromagnetic waves employed for telecommunication. Compensation of signal path propagation is accomplished for substantially any, or any, sources of delay such as for example mismatches (e.g., impedance mismatch) among electronic elements and components, stray capacitances and inductances, length of the antenna(s) cable(s) in base station(s); tower height of base station, any signal propagation scattering, or "signal bounces," such as multipath or strong reflections, etc.; and the like. Compensation is effected through determination of a propagation delay, or effective total timing delay (ETTD). Such determination is based at least in part on statistical analysis of accurate location estimates of reference positions throughout a wireless network deployment including the effective coverage area(s) of one or more sectors or cells, and location estimates of the reference positions generated through time-of-flight (TOF) measurements of wireless signals. Determination of propagation or signal path delay offset also is attained iteratively based at least in part on reference location estimates and TOF location estimates. In an aspect, high-accuracy (e.g., 1 m-10 m) location estimates of mobile devices, such as estimates obtained via assisted global positioning system (AGPS) or other global navigation satellite systems (GNSSs), e.g., Galileo or GLONNAS (Global'naya Navigatsionnaya Sputnikovaya Sistema or Global Navigation Satellite System), are employed as reference location estimates. Thus, aspects or features of the subject innovation enable calibration of distance from a serving base station and associated timing, and calibration of angular, or azimuth, position within a served sector and associated timing, or any combination thereof. In another aspect, locations of probes or wireless beacons deployed at known locations are employed as reference positions. When an effective total timing delay, which includes propagation delay, is determined, wireless signal propagation delay information can be corrected, or compensated, thus allowing improvement of the accuracy obtained using time of flight (TOF) location estimates, such as Third Generation Partnership Project (3GPP)-defined CGI+TA or CGI+RTT. In addition, compensated wireless signal propagation delay can enable mapping sector coverage. Improvements in the radio network performance also can arise from compensation of effective total timing delays.

At least two advantages of the system(s) and method(s) of the subject innovation and aspects therein are (i) substantially reduced magnitude of the error for propagation delay used in "time of flight" calculations by several position determination functions (PDFs), and associated component(s) for implementation thereof, in wireless location services. As an example, for a representative Global System for Mobile Communications (GSM) or Universal Mobile Telecommunications System (UMTS) base station without distributed antenna system (DAS), the error in location determination can be reduced by as much as several hundred meters when compensation for wireless signal timing variation is included as described herein. It is noted that for a wireless environment served, at least in part, through a DAS the error in location fix can be reduced by as much or even more than 1000 meters. Accordingly, the system(s), method(s), and aspects thereof described herein improve the accuracy of TOF location estimates with respect to estimates provided by conventional systems that ignore, or fail to incorporate, propagation delay in estimation of timing advance (TA) or round trip time (RTT), or any time of flight quantities utilized to estimate location(s) in operational wireless systems. (ii) Improvement(s) in radio network performance that results, for example, from accurate timing in FL (forward link) signaling (e.g., pilot sequence(s)) which can facilitate cell search or synchronization, or handover. In addition, calibrated signal timing delay can provide accuracy in location estimates that allows utilization of location data as a metric to generate, at least in part, lists of candidate Node Bs for handover, or establish criteria (e.g., handover occurs when a mobile device is within a specific time-delay band) for handover from a confined coverage cell, e.g., a femtocell, to macrocell coverage.

Aspects, features, or advantages of the subject innovation can be exploited in substantially any, or any, wireless telecommunication, or radio, technology or network; Non-limiting examples of such technologies or networks include Femto-cell technology, Wi-Fi, Worldwide Interoperability for Microwave Access (WiMAX); Enhanced General Packet Radio Service (Enhanced GPRS); Third Generation Partnership Project (3GPP) Long Term Evolution (LTE); 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rate for GSM Evolution (EDGE) Radio Access Network (RAN) or GERAN; UMTS Terrestrial Radio Access Network (UTRAN); or LTE Advanced. Additionally, substantially all aspects of the subject innovation can include legacy telecommunication technologies.

To the accomplishment of the foregoing and related ends, the invention, then, comprises the features hereinafter fully described. The following description and the annexed drawings set forth in detail certain illustrative aspects of the invention. However, these aspects are indicative of but a few of the various ways in which the principles of the invention may be employed. Other aspects, advantages and novel features of the invention will become apparent from the following detailed description of the invention when considered in conjunction with the drawings.

FIG. 1A is a schematic example wireless environment 100 that can operate in accordance with aspects described herein. In particular, example wireless environment 100 illustrates a set of macro cells. Three macro cells $105_1$-$105_3$ comprise the illustrative wireless environment; however, it should be appreciated that wireless cellular network deployments can encompass up to $10^4$-$10^5$ coverage macro cells. Coverage macro cells cells $105_\lambda$ ($\lambda$=1,2,3) are illustrated as hexagons; however, coverage cells can adopt other geometries generally dictated by a deployment configuration or floor plan, geographic areas to be covered, and so on. Each macro cell $105_\lambda$ is sectorized in a $2\pi/3$-radians central-angle configuration in which each macro cell includes three sectors, demarcated with dashed lines in FIG. 1. It should be appreciated that other sectorizations are possible, and aspects or features of the subject innovation can be exploited regardless of type of sectorization. Macro cells $105_1$ and $105_2$ are served respectively through Node B $110_1$ and $110_2$ and respectively associated radio component(s) $114_1$ and $114_2$, whereas macro cell $105_3$ is covered via a DAS system comprised of radio component(s) $114_3$ and three distributed antennas $118_1$-$118_3$. It is noted that radio component(s) (e.g., 1141-1143) are functionally coupled through links 116 such as cables (e.g., RF and microwave coaxial lines), ports, switches, connectors, and the like, to a set of one or more antennas (e.g., $112_1$, $112_2$, and $118_1$-$118_3$) that transmit and receive wireless signals. It is noted that a radio network controller (not shown), which can be a part of mobile network platform(s) 108, and set of base stations (e.g., Node B $110_n$, with n=1,2) that serve a set of macro cells; electronic circuitry or components associated with the base stations in the set of base stations; a set of respective wireless links (e.g., links $115_k$ k=1,2,3) operated in accordance to a radio technology through the base stations form a macro radio access network (RAN). It is noted that based on network features, the radio controller can be distributed among the set of base stations or associated radio equipment. In an aspect, for UMTS-based networks, wireless links $115_\lambda$ embody a Uu interface.

Mobile network platform(s) 108 facilitates circuit switched (CS)-based (e.g., voice and data) and packet-switched (PS) (e.g., internet protocol (IP), frame relay, or asynchronous transfer mode (ATM)) traffic and signaling generation, and delivery and reception for networked telecommunication, in accordance with various radio technologies for disparate markets. Telecommunication is based at least in part on standardized protocols for communication determined by a radio technology utilized for communication. In addition telecommunication can exploit various frequency bands, or carriers, which include all EM frequency bands licensed by the service provider, or service provider network 165, (e.g., personal communication services (PCS), advanced wireless services (AWS), general wireless communications service (GWCS), and so forth), and all unlicensed frequency bands currently available for telecommunication (e.g., the 2.4 GHz industrial, medical and scientific (IMS) band or one or more of the 5 GHz set of bands). In addition, wireless network platform(s) 108 can control and manage base stations $110_\lambda$, and radio component(s) associated thereof, in disparate macro cells $105_\lambda$ via, for example, a wireless network management component (e.g., radio network controller(s), cellular gateway node(s) or associated serving node(s)). Similarly, wireless network platform(s) 108 also can control and manage radio component(s) in a DAS such as the one illustrated in cell $105_3$. Moreover, wireless network platform(s) can integrate disparate networks (e.g., femto network(s), Wi-Fi network(s), femtocell network(s), broadband network(s), service network(s), enterprise network(s) . . . ) In cellular wireless technologies (e.g., 3rd Generation Partnership Project (3GPP) Universal Mobile Telecommunication System (UMTS), Global System for Mobile Communication (GSM)), wireless network platform 108 is embodied in a core network and a set of radio network controllers.

In addition, wireless backhaul link(s) 151 can include wired link components like T1/E1 phone line; a digital subscriber line (DSL) either synchronous or asynchronous; an asymmetric DSL (ADSL); an optical fiber backbone; a coaxial cable, etc.; and wireless link components such as line-of-sight (LOS) or non-LOS links which can include terrestrial air-interfaces or deep space links (e.g., satellite communication links for navigation). In an aspect, for UMTS-based networks, wireless backhaul link(s) 151 embodies IuB interface.

It should be appreciated that while example wireless environment 100 is illustrated for macro cells and macro base stations, aspects, features and advantages of the subject innovation can be implemented in microcells, picocells, femtocells, or the like, wherein base stations are embodied in home-based access points.

Figure 1B:
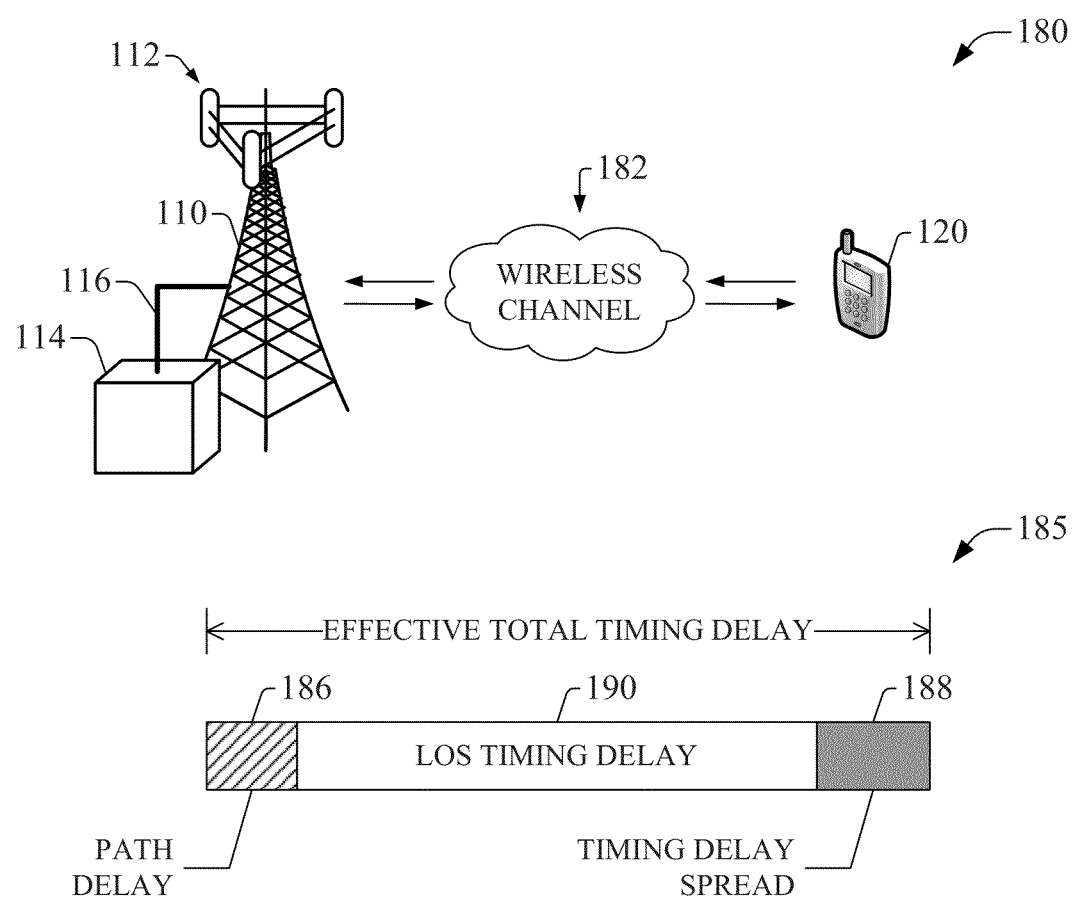

Propagation timing of wireless signals spans the time from wave signal generation or output at radio equipment (e.g., radio component(s) 114) to detection at the handset (e.g., mobile 120). Such timing includes signal path propagation through link(s) 116 to antenna(s) 112, and propagation over the air interface or wireless channel. Time of flight measurements probe time of arrival, which is the propagation timing, or round trip time which includes propagation timing from the handset to the radio equipment. As illustrated in FIG. 1B, propagation timing 185, effective total timing delay, includes path delay 186 ($\Delta\tau^{(path)}$) and over-the-air-interface (e.g., wireless channel 182) propagation which includes line-of-sight (LOS) timing delay 188 ($\Delta\tau^{(LOS)}$) and timing delay spread 190 ($\Delta\tau^{(spread)}$).

Path delay 186 typically is caused by various source, e.g., mismatches (e.g., impedance mismatch) among electronic elements and components, stray capacitances and inductances, length of the antenna(s) cable(s) in base station(s); tower height of base station, whereas timing delay spread 188 generally originates from any signal path scattering, or "signal bounces," such as multipath, strong reflections, etc.; and the like. It should be appreciated that timing delay spread 188 is largely stochastic and affected by complex and substantially unknowable sources or variables. In an aspect of the subject innovation, contribution of path delay and timing delay spread to propagation timing can be compensated, at least in part, and thus propagation timing can be employed for accurate location determination, since calibrated propagation timing substantially reveals LOS timing delay $\Delta\tau^{(LOS)}$. It is noted that compensation of propagation timing delay offsets can depend on coverage sector, since structure of wireless channel 182, or wireless environment, typically depends on covered sector; e.g., a first sector can be primarily densely populated while a neighboring sector can include a substantial area of public parks (e.g., dashed area(s) in diagrams 300 or 350).

Figure 1C:
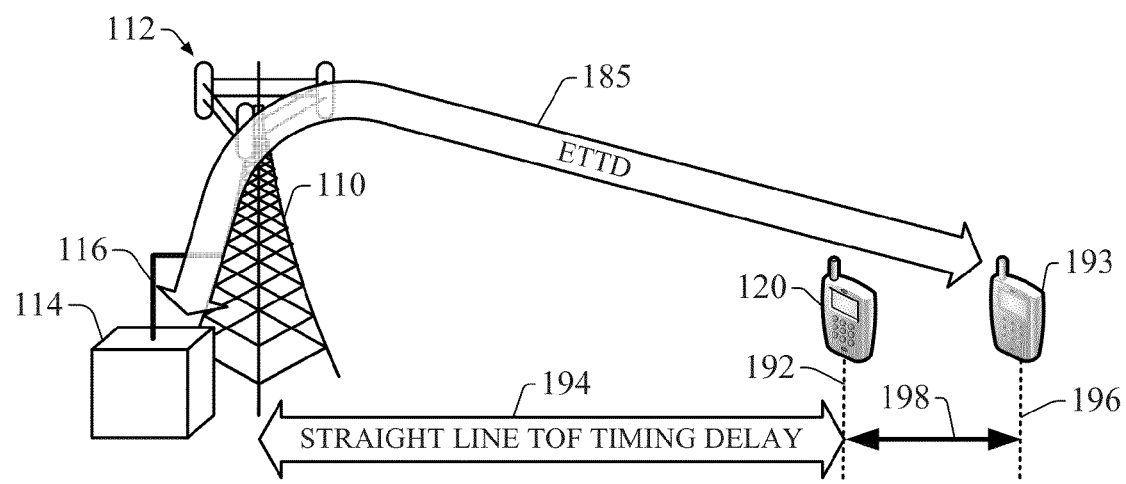
FIG. 1C illustrates at least a portion of calibration of propagation delay(s) in accordance with aspects described herein.

To illustrate, at least in part, calibration of propagation timing delay offset(s), FIG. 1C displays an ideal propagation path, e.g., a straight-line pathway, from a location at the base of a tower that supports antenna(s) 112 to a location 192 of mobile 120. The straight-line pathway has an associated straight line TOF timing delay 194, which can convey the range of mobile 120 from the base station 110. The effective total timing delay 185 yields a TOF-based location estimate that effectively locates mobile 120 at a position 196 from the base station 110; mobile 120 is represented as a shadowed mobile 193 for illustrative purposes. Calibration of propagation timing delay offset(s) compensates for location offset 198 along an idealized straight-line pathway; namely, a propagation timing delay offset supplies a location correction 198 that compensates the difference between the TOF estimated range 196 and the actual straight-line range 192 from the base station 110.

Generally, propagation delays in the signal path (e.g., path delay 186) between base station radio component(s) (e.g., $114_k$) and sector antennas (e.g., antennas $112_n$) are assumed to be small and are not compensated for. Yet, for some base stations, e.g., Node B $110_1$, such propagation delays can be large. As an example, in a DAS, e.g., macro cell $105_3$, propagation delay between the radio component(s) (e.g., $114_3$) and the antennas ($118_1$-$118_3$) comprising the DAS can be several times the delay between the sector antenna (e.g., antenna $118_1$) and the handset (e.g., mobile 120), thus contributing to significant inaccuracy in location estimates(s) of a mobile station (e.g., 120) based on radio signal "time of flight" or time of arrival. Low-power wireless radio cells such as femtocells, picocells, Wi-Fi hot-spots, or the like, also can be substantially affected by signal path propagation delays and timing delay spread.

It is noted that for the effective operation of a base station to communicate voice and data between the network and a subscriber, calibration of propagation delay may not be necessary. The network estimates electronically a single overall propagation delay magnitude that is related to an estimate of the time it takes a signal to travel round trip between the base station (BS) radio and the subscriber mobile station (MS) regardless of propagation pathway between BS and MS. Substantially all, or all, propagation delays are treated as a single propagation delay, and may be significantly different from the line of sight, tower-to-subscriber propagation path delays.

Next, aspects of calibration of propagation timing delay provided in the subject innovation are discussed in greater detail.

Figure 2:
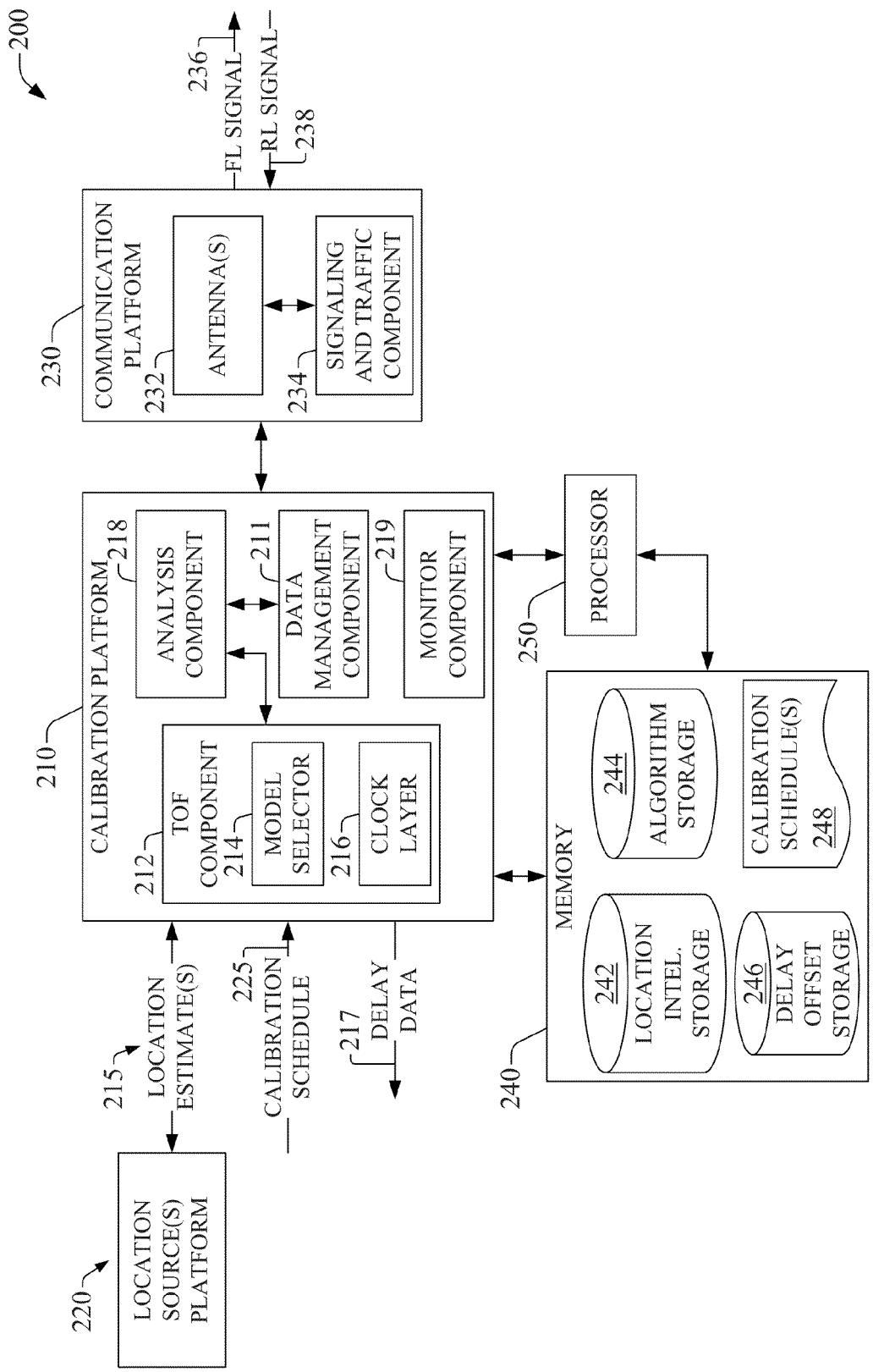
FIG. 2 is a block diagram of an example system that facilitates calibration of wireless signal propagation delay in accordance with aspects described herein.

FIG. 2 illustrates a block diagram of an example system 200 that facilitates calibration of wireless signal, e.g., radio frequency (RF), microwave, infrared, propagation delay in accordance with aspects described herein. In an aspect, system 200 can be a part of a mobile network, and can reside at least in part within at least one of a network management component—e.g., radio network controller, base station controller or one more components therein such as a serving mobile location center (SMLC); a core network or one or more component therein; or network gateway—or a base station or access point. Example system 200 includes a calibration platform 210 that facilitates compensation of wireless signal timing variations or offsets, or correction of wireless signal propagation information. Calibration platform 210 includes a "time of flight" component 212 that can estimate location of a mobile device or a stationary device that can communicate wirelessly. To at least that end, TOF component 212 can include a model selector 214 that extracts a propagation model for wireless signal, e.g., RF signal, microwave signal, infrared signal, etc. The propagation model can be retained in algorithm storage 244 and utilized in conjunction with propagation timing delay among forward link (FL) and reverse link (RL) wireless signals, e.g., signaling or traffic, delivered and received, respectively, by a base station or access point. In an aspect, in example system 200, calibration platform 210 can receive an indication when a FL wireless signal 236 is conveyed by a signaling and traffic component 234 in a communication platform 230, which can be a part of a serving access point. Such indication can trigger a timer (not shown) in clock layer 216, the timer stops when calibration platform 210 receives an indication a RL wireless signal 238, in the RL counterpart transport channel that delivered FL signal 236, is received in signaling and traffic component 234. It should be appreciated that communication platform 230 includes antenna(s) 232, which are distributed in a DAS; e.g., such as the one illustrated in coverage macro cell $105_3$.

Figure 3A:
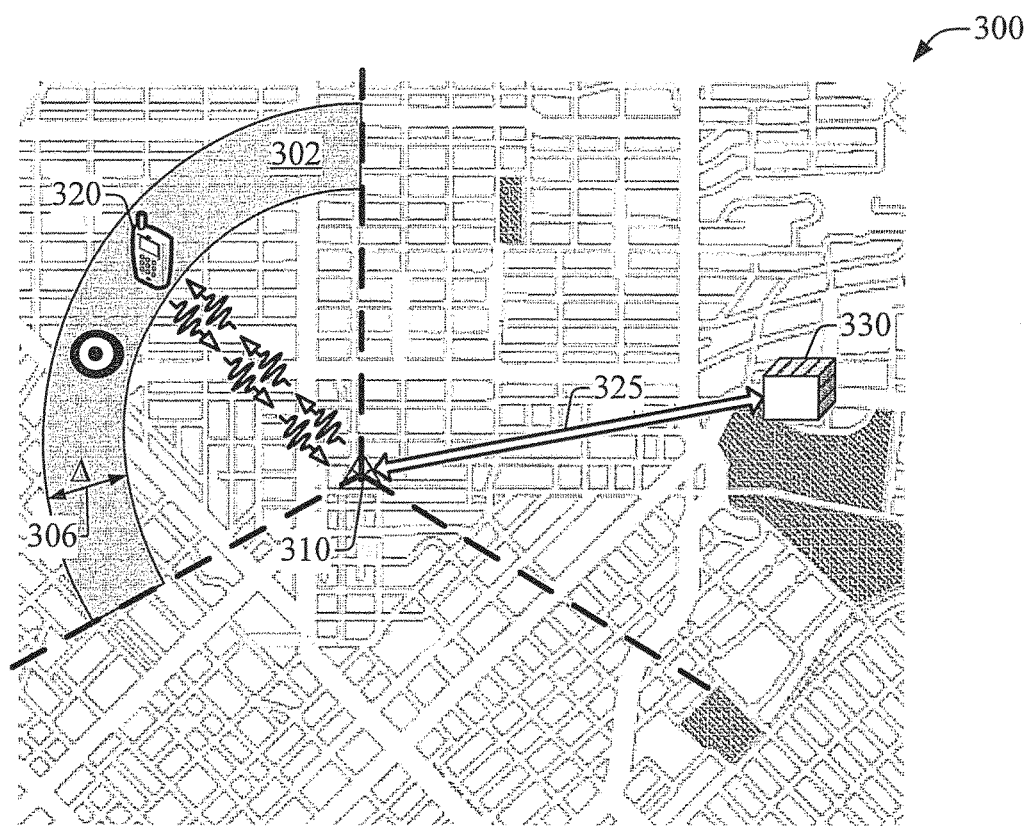
FIGS. 3A-3B are diagrams of estimated locations for a mobile station within a wireless coverage sector in accordance with aspects described herein.
Figure 3B:
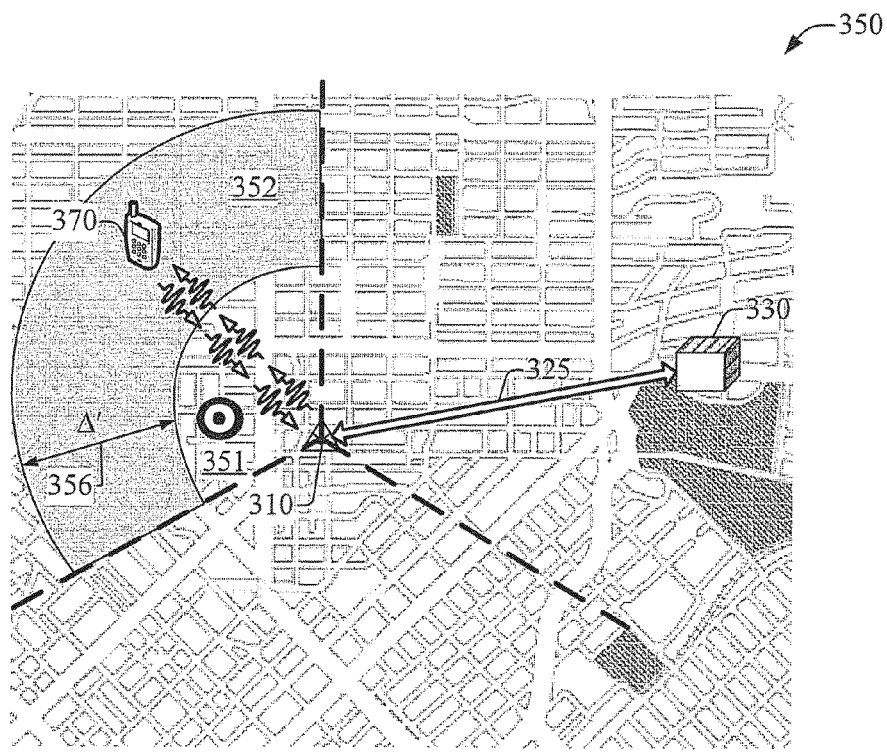

As described above, TOF component 212 can measure the propagation timing delay via at least in part clock layer 216; the timing delay can include TA, angle of arrival (AOA), RTT, RL Time of Arrival (RL-TOA), RL Time Difference of Arrival (RL-TDOA), FL-TOA, FL-TDOA, or observed TOA (O-TOA), and associated PDFs. It is noted that timing delay data is part of basic, conventional wireless handset RAN operation, and no additional equipment is necessary in general to generate such data. Timing delay data in conjunction with coverage cell or sector identifiers, such as cell global identity (CGI) or pilot code sequence(s), provide a location estimate. In an aspect, while measured RTT can be of the order of a few hundred microseconds, latency to report or determine, e.g., compute, a location estimate based on TOF measurement(s) can be approximately 20 seconds or more. FIG. 3A is a diagram 300 of an urban area and illustrates, in part, that such location estimate identifies a portion of a timing-delay annular band, or TA or RTT band 302, wherein the width A 306 of the annular region can range from 5-100 meters based upon time resolution (dictated, for example, by clock source of radio circuitry) associated with radio channel frame structure for the wireless technology employed by the serving base station 310. In diagram 300, $\Delta=50$ m. It is noted that the annular region is illustrative and disparate telecommunication systems can display regions of disparate morphology; for instance, simulcast DAS units can exhibit nearly linear regions. Predicted TOF location estimate for the illustrated mobile station 320 resides within the timing-delay annular band. TOF estimates can be delivered via backhaul link 325 to a network management component 330 when a calibration component resides therein. As mentioned above, propagation timing delay data is not calibrated. Such lack of calibration can affect location accuracy severely since the inner or outer radii of the annular region of space is dictated by the propagation timing delay. In particular, as illustrated through diagram 350 of an urban area in FIG. 3B, in wireless technologies with radio channel frame structure such that width $\Delta'$ 356 of a timing-delay annular band associated with a location estimate is in the range of few hundred meters (e.g., 800-1000 m), erroneous identification of a timing-delay band as a result of calibration error, or lack thereof, can result is substantive inaccuracy in identification of a timing-delay band, with determination errors of the order of nearly ten times the magnitude of the timing-delay band. In diagram 350, handset 370 resides in timing-delay (e.g., TA) band 2 352, whereas TOF estimate based on CGI and timing delay can predict handset is located (bull's eye diagram) in timing-delay band 1 351 as a result of not accounting for propagation delay offset. TOF estimates can be delivered via backhaul link 325 to a network management component 330 when a calibration component resides therein. For home-based access points (e.g., femto access points), TA bands or RTT bands are located outside the home environment and includes various bands in the confined coverage area afforded by the home-based, generally low-power, access points.

Calibration platform 210 also includes analysis component 218 that can implement various algorithms, stored in algorithm storage 244, to characterize or evaluate features of location data, or estimates, generated by TOF component 212; location data can be retained in location intelligence storage 232. In an aspect, algorithms employed by analysis component 218 include statistical analysis methodologies; other analysis methodologies such as spectral analysis and time-series analysis also can be utilized.

Figure 4A:
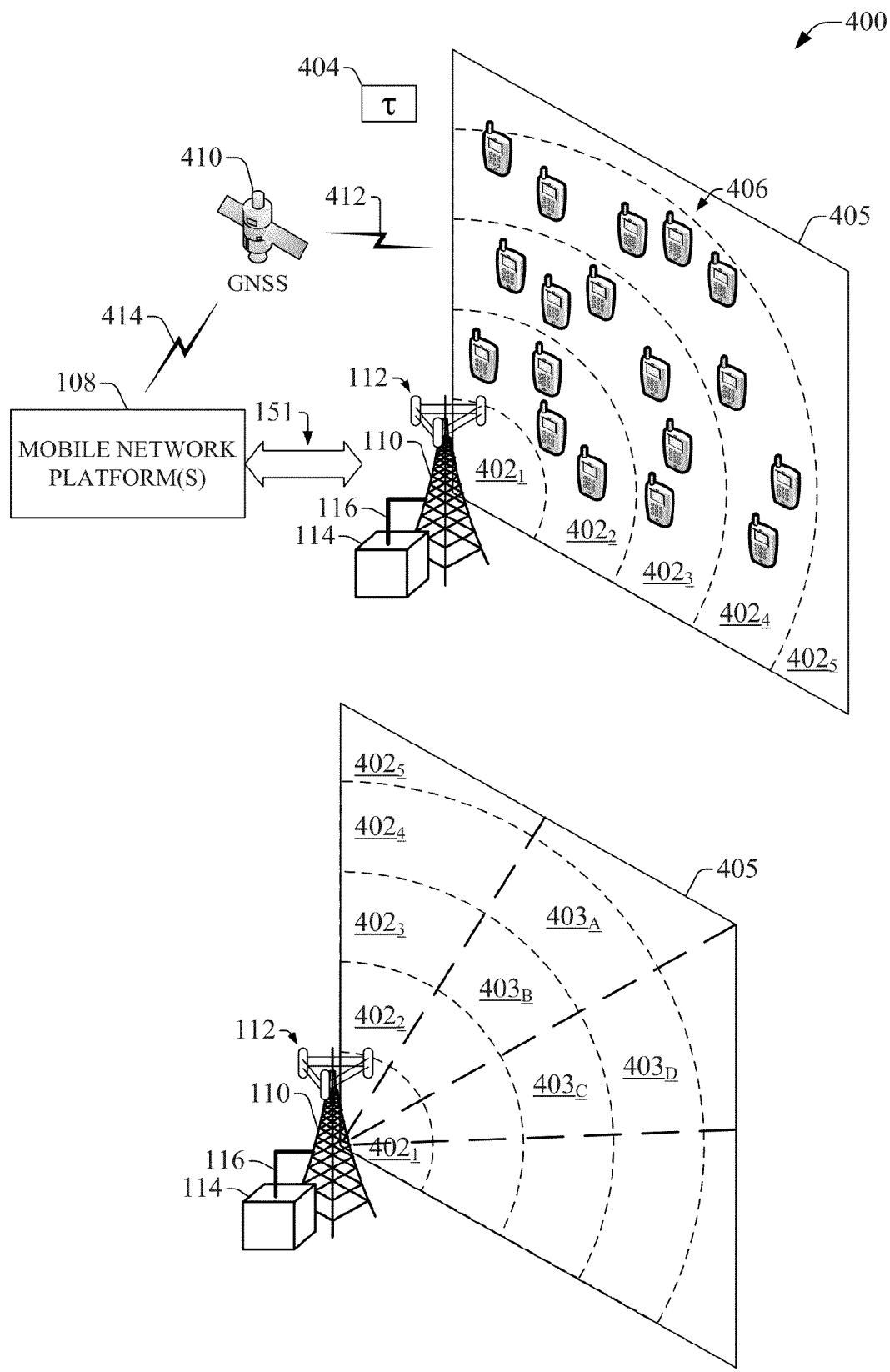
FIGS. 4A-4B illustrates, respectively, a diagram of a set of wireless devices that communicates with a GNSS and delivers accurate location information based at least in part upon communication therewith, and a diagram of an example system that receives the GNSS-based accurate location information and exploits it for calibration of propagation delay in accordance with aspects of the subject innovation.
Figure 4B:
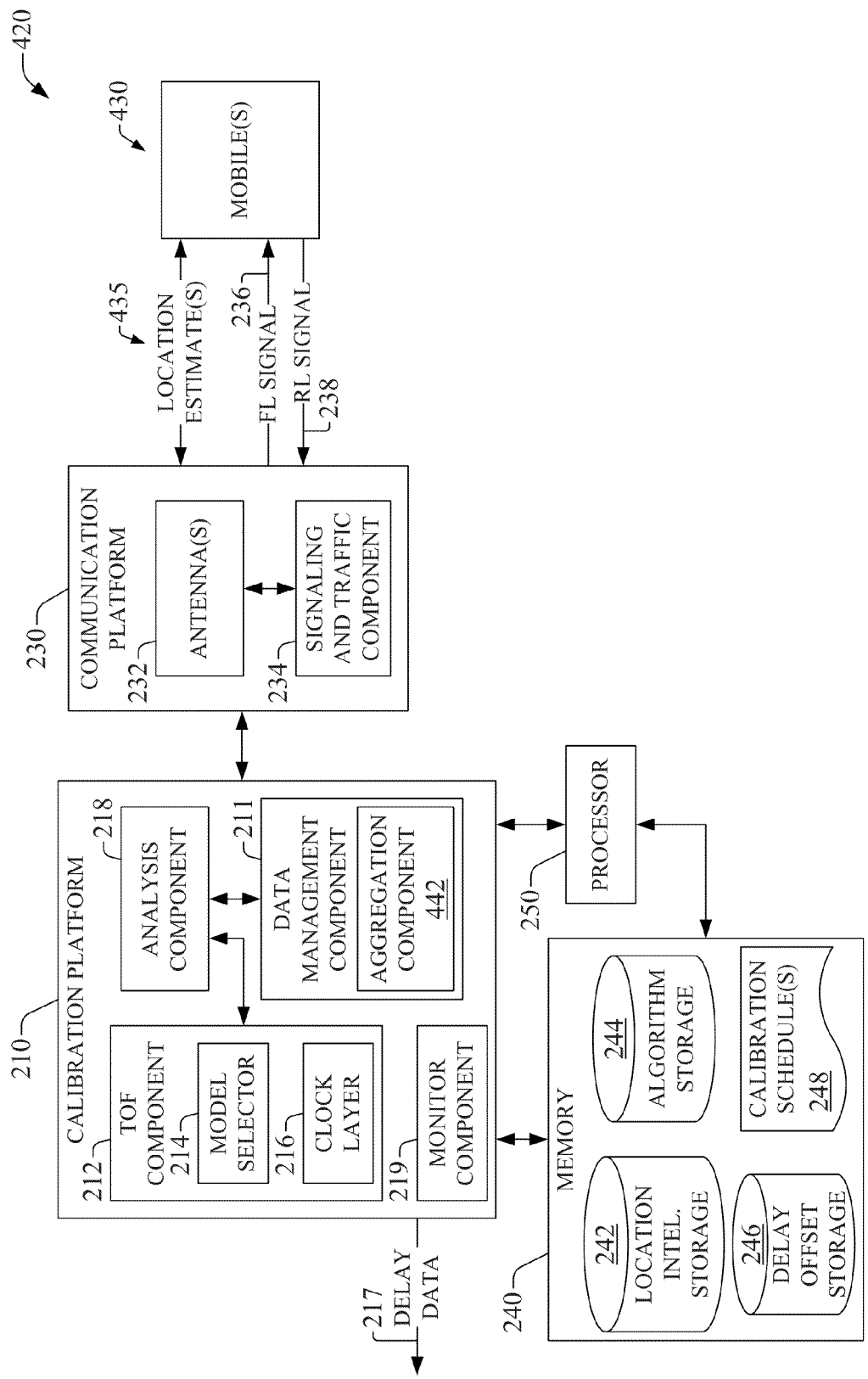

To enable compensation of wireless signal (e.g., RF, microwave, infrared . . . ) timing variations, or correction of wireless signal propagation information, calibration platform 210 receives location estimate(s) 215, which originate from location source(s) platform 220. In an aspect, location source(s) platform 220 can include one or more PDFs and component(s) for generation thereof. Data management component 211 can receive the location estimate(s) data 215, or any other data such as timing delay data. Received location estimate(s) 215 are retained in location intelligence storage 242. It should be appreciated that based upon specific aspects of location source(s) platform 220, calibration platform 210 can receive location estimate(s) 215 over the air-interface (e.g., 182) via communication platform 230, or through a network management component such as a network server; a radio network controller; or a network gateway or associated serving node(s), e.g., gateway mobile location center (GMLC) and related serving mobile location center (SMLC). Location source(s) platform 220 provides accurate location data based at least in part on GNSS, such as assisted GPS, and network planning information. In an aspect, location source(s) platform 220 is embodied in a set of mobile devices that support GNSS data reception and manipulation thereof, as illustrated in FIGS. 4A and 4B. Diagram 400 in FIG. 4A displays a snapshot at an instant τ404 of a set 406 of eighteen mobile devices distributed through four TA bands $402_1$-$402_4$ that communicate with a GNSS system 410 (e.g., GPS, Galileo, GLONASS . . . ) through a deep-space link 412. Mobile devices in set 406 receive timing signaling that allows determination, at least in part, of accurate position of each mobile the receives sufficient information (e.g., timing information from three or more satellites) for triangulation. It is noted that in AGPS the mobile devices in set 406 can receive timing messages via one or more components in network mobile platform(s) 108; in an aspect, the one or more components can include PDF(s), e.g., CGI+RTT, FL-TDOA or the like, and node(s) for generation or implementation thereof. Mobiles in set 406 also can receive assisted timing information from mobile network platform(s) 108 through base station 110 serving sector 405; mobile network platform(s) 108 received timing information from GNSS 410 through deep-space link 414. Mobiles in set 406 deliver accurate position data to base station 110, which receives the data through antenna(s) 112 and radio component(s) 114 and conveys such data to a calibration platform (e.g., 210). In block diagram 420 in FIG. 4B, mobile(s) 430 can be embodied in the set of mobile devices 406. Communication platform 230, which is part of base station 110, receives GNSS-based location estimates 435 over the air-interface (e.g., wireless channel 182) form mobile(s) 430. Location estimate(s) 435, or location information, can be provided at various time instants and aggregated at calibration platform 210 through aggregation component 442 in data management component 211. Aggregation component 442 collects location estimates 435 received, and generated, at disparate instants in order to augment statistical significance of data and analysis thereof, which can improve accuracy of extracted propagation delay offsets. As described above, TOF component 212 generates a set of location estimates of the same ground truth associated with respective locations 435 through FL signal 236 delivered to one or more mobile(s) 430 and RL signal 238 received there from. In addition, calibration component 210 can extract a sector identifier (ID) received RL signal 238 to map, via analysis component 218, coverage area of the sector that serves the mobile that conveys RL signal 238. At least one of such mapping or angular position available through location estimates, and range calibration based at least in part on distance from a base station can enable calibration of sector bearing, e.g., location of the mobile that communicates RL signal 238 and the centerline between the receiver RL and the transmitter FL antenna. In an aspect, the mapping can be included and conveyed as part of delay data 217.

It should be appreciated that calibration of sector bearing, or angular calibration of propagation timing delay, can be conducted in addition to range calibration, or determination of timing delay offset in ETTD for RTT bands, in order to account for variations of propagation timing delay within a specific RTT band (e.g., $402_3$), or specific TA band, e.g., band 302. Concomitant, or nearly concomitant, calibration of sector bearing of a mobile handset, and calibration of distance from base a serving base station, can (i) lead to determination of timing delay errors for one or more respective tiled portions of a sector, e.g., tiles $403_A$-$403_D$ can be calibrated or compensated in accordance with respective timing delays based on distance from base station 110 and position within an RTT band such as $402_3$ and $402_4$; and (ii) account for substantially disparate degrees of multipath effects in one section of a sector with respect to a disparate section of the sector; for example, in one boundary region of a sector, multipath effects can be substantive leading to severe signal scattering, whereas in another boundary of the sector multipath effects can be negligible. Thus, angular calibration of ETTD combined with calibration of ETTD associated with range of a mobile device (see, e.g., FIG. 1C) can set different corrections to propagation delay based at least in part on a served sector in which the mobile device operates. It is noted that in a highly-sectorized cell, e.g., 6 or more sectors, angular calibration as described herein can account for disparate levels of correction, or compensation, of timing delay based at least in part on level of traffic with a sector, e.g., a sector near a highway or an amusement park, as opposed to a sector near several parking lots within an industrial area. It is also noted that calibration data (e.g., data in delay offset storage 246) for disparate sectors can be extrapolated or predicted for sectors or cells without available location data based at least in part on solution of differential equations or other methodologies.

Calibration of ETTD and associated timing delay error for range or distance from a base station, and sector bearing or angular position within a served cell or sector can enable refinement of location services based at least in part on CGI+ RTT, for example, and improvement of conventional methods that may refine CGI+RTT.

Figure 5A:
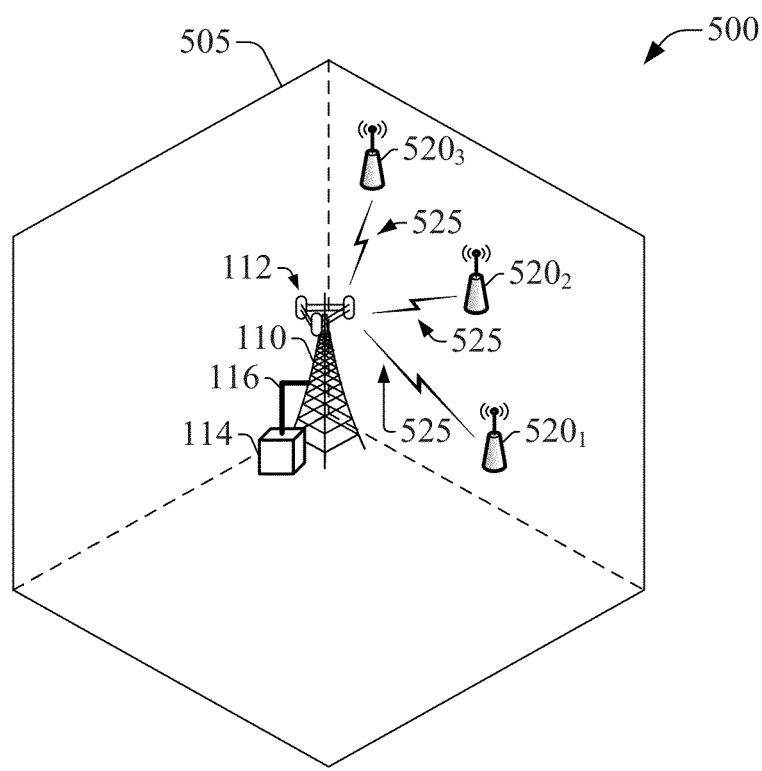
FIGS. 5A-5B present, respectively, diagram of a set of probes located at fixed location within a macro cell sector that facilitate determination of propagation delay in accordance with aspects described herein, and a diagram of an example system that receives accurate location information of the set of probes and exploits it for calibration of propagation delay in accordance with aspects of the subject innovation.
Figure 5B:
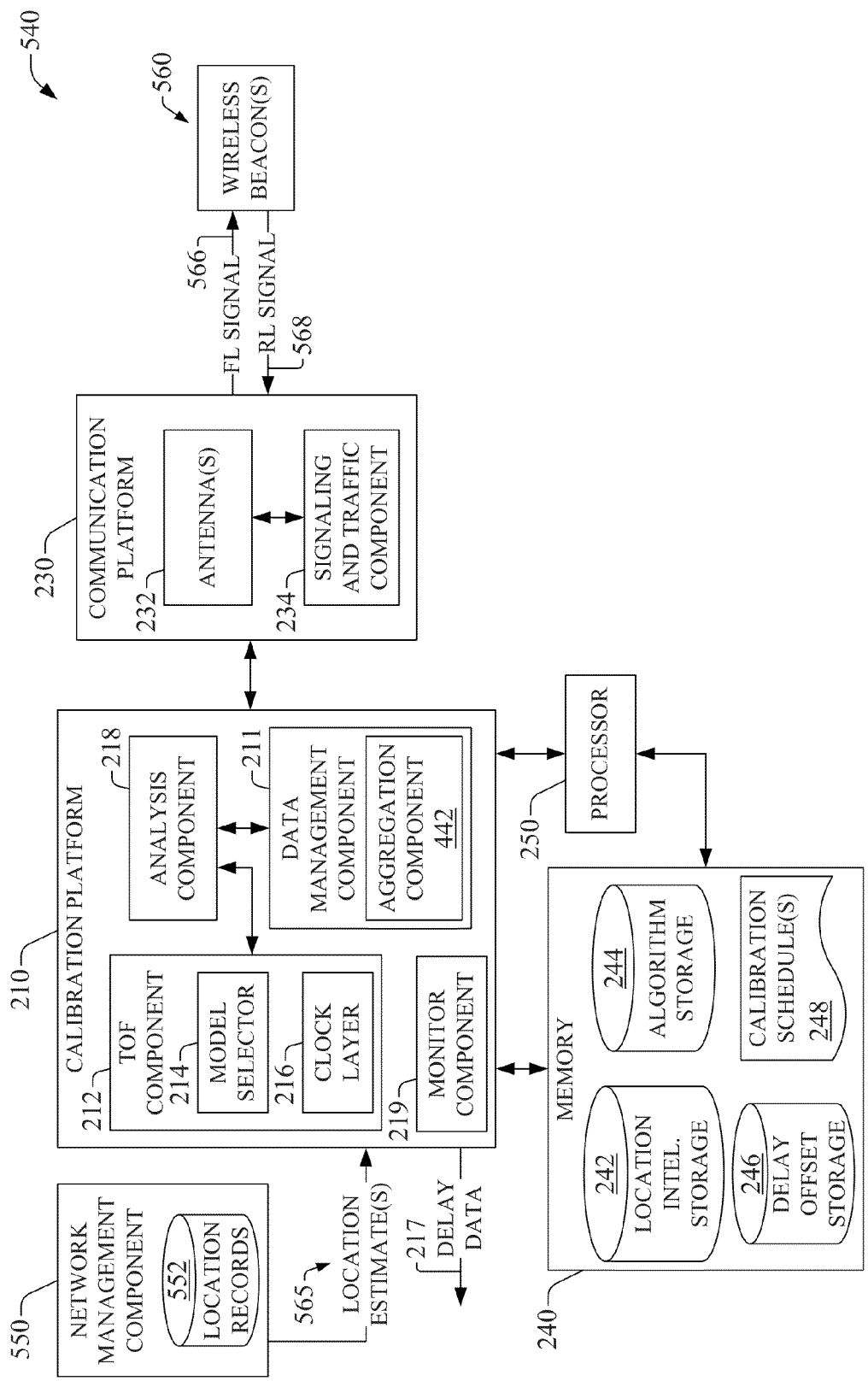

Additionally or alternatively, in another aspect, location source(s) platform 220 is embodied in one or more network components, such as for example GMLC or SMLC, that supply location estimate(s) 215 embodied in records of position of a set of probes, or wireless beacons, deployed within a coverage cell or sector, as illustrated in FIGS. 5A and 5B. In an aspect, position determination functions (PDFs) provide, at least in part, such records of position. In diagram 500, macro cell 505 is divided in three sectors (demarcated by dashed lines) served by base station 110, wherein a sector includes a set of three probes $520_1$-$520_3$ located at specific positions that are known, or available, to the one or more network components (e.g., mobile network platform(s) 108). Probes $520_1$-$520_3$ communicate with base station 110 through a sector antenna within antenna set 112 via wireless links 525. Positions of probes $520_1$-$520_3$ can cover more than one timing advance bands to improve reliability of statistical analysis employed to determine a propagation delay offset. Wireless probes, or beacons, can be stationary or pseudo-stationary. In an example, wireless probes can be Wi-Fi outdoor access points that are part of a public metropolitan network. In another example, wireless probes can be part of wireless-enabled utility equipment (e.g., electric meter(s)) deployed within a utility network, e.g., electric grid. It should be appreciated that wireless beacons embodied in utility meters can be better suited for smaller, urban coverage sectors, since transmission power of such probes can be low compared to power from Wi-Fi access points. In yet another example, beacons or wireless probes can be location equipment, e.g., location measurement units (LMUs), GNSS apparatuses, or probes, deployed in cells or sectors, particularly equipment located in cells or sectors disparate to a cell or sector that performs the calibration described herein. In a further example, wireless beacons can be truck-mounted radio or microwave transceivers, such as those fitted in service or public transportation vehicles, temporarily stationed in disparate locations throughout a sector to facilitate TOF data collection.

In example system 540 in FIG. 5B, network management component 550 has access to accurate location records 552 of wireless beacon(s) 560, and delivers location estimate(s) 565 which comprise such records. In an aspect, location records 552 can be generated at least in part trough one or more PDFs. Network management component 560 can be embodied in a radio network controller, a network gateway (e.g., GMLC) and associated serving node(s) (SMLC), or a service network node or server that receives location or route logs of a service truck with mounted RF or microwave transceivers. In another aspect, network management component 560 can deliver location estimate(s) 565 at disparate times based on location of a pseudo-stationary wireless beacon(s) 560. In yet another aspect, location estimate(s) 565 can be delivered as information on deployment of additional wireless beacons becomes available. TOF component 212 generates a set of location estimates of wireless beacon(s) 560 through FL signal 566 and RL signal 568. Aggregation component 442 in data management component 211 aggregates received location estimate(s) 565 and generated TOF-based location estimates, of respective received location estimates 565, to improve data statistics and quality of data analysis and accuracy of extracted propagation timing delay offsets.

In an aspect of the subject innovation, analysis component 218 can extract sector IDs of deployed wireless beacon(s) 560 and contrast such sector IDs with nominal sector location of wireless beacon(s) 560 in order to map nominal sectorization information to actual sectorization data extracted from TOF-based location estimates. Through mapping of actual sectorization data to nominal sectorization information, as conveyed by location estimate(s) 565 of deployed wireless beacon(s) 560, e.g., mobile devices $520_1$-$520_3$, effective sector coverage area can be calibrated in addition to compensation of wireless signal timing delay offsets. Effective, or calibrated, sectorization maps can be retained in location intelligence storage 242. Judicious deployment of wireless beacon(s) 560, e.g., high-density deployment of wireless probes in the vicinity of nominal sector boundaries, and sectorization mapping effected by calibration platform 210 can determine actual coverage pattern of one or more sectors in the field. It should be appreciated that such sectorization mapping can reveal actual sector boundaries, which are typically affected by stochastic sources of wireless signal scattering, e.g., multipath, shadowing, or the like.

It is noted that while in example system 540 calibration component 210 is illustrated as external to network management component 550, in one or more alternative or additional example systems or embodiments calibration component 210 can resided at least in part within network management component 550.

Figure 4C:
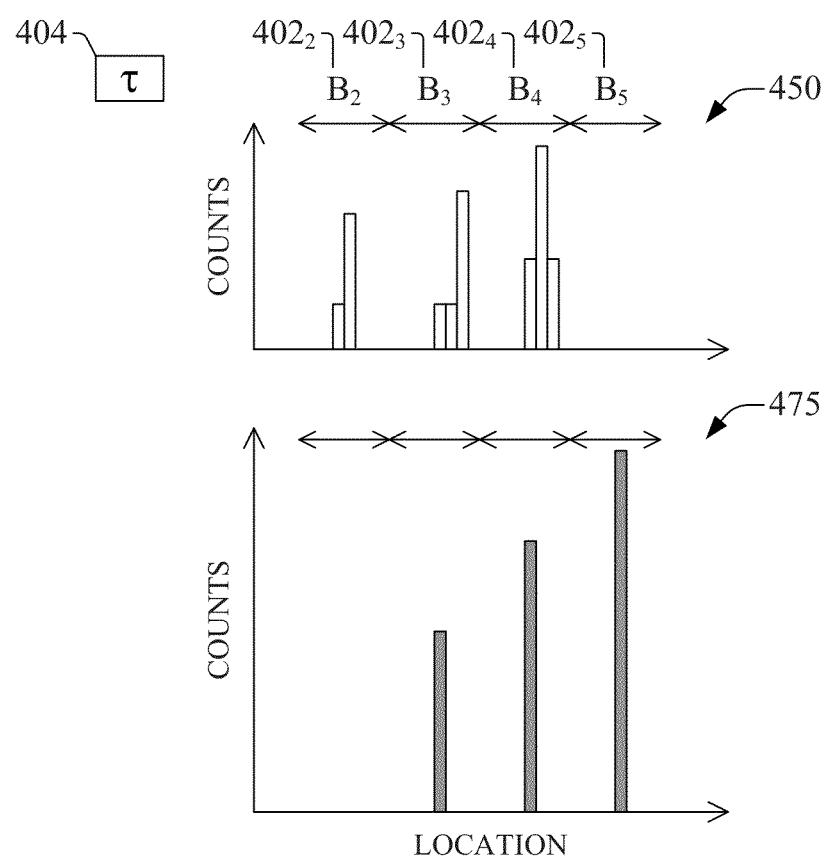
FIG. 4C represent histograms of location estimates obtained with an accurate approach to location determination and associated non-calibrated TOF location estimates in accordance with aspects of the subject innovation.

In example system 200, calibration platform 210 utilizes location estimate(s) 215 and timing delay measurements in at least two manners in order to measure RF signal or microwave signal propagation delay and thus correct the RF signal or microwave signal propagation information. (1) Location estimate(s) 215 obtained from handsets (e.g., mobiles in set 406) that support generation of high accuracy location data are complemented with location estimate(s), of the same ground truth, generated by TOF component 212 as described above, e.g., via CGI+TA or CGI+RTT, or other RL, FL or observed TOA and TDOA approaches. Analysis component 218 then performs a statistical analysis of the highly accurate received location estimate(s) and the TOF location estimate(s) and establishes a relationship, e.g., a correlation, between the two location estimates. In an aspect, correlation is determined to establish a degree to which a set $\{\rho_i\}$, with i=1,2 . . . N, and N is a natural number, of highly accurate location estimates are linearly related to a set $\{\rho'_i\}$ of TOF location estimates. It should be appreciated that the first a second set of location estimates are expected to be linearly dependent, particularly for radio technologies with high-speed clocks rates which provide short frame structure and thus afford a larger number of narrow TA bands. For nearly uniform propagation air-interface in which multi-path, strong reflection, and signal scattering is nearly uniform throughout a sector, the relationship among location estimates in the first set and TOF location estimates in the second set can be cast as $\rho_i=\rho'_i+\Delta\rho$, where $\Delta\rho$ is a uniform position offset. However, it should be appreciated that non-linear relationship(s) among $\{\rho_i\}$ and $\{\rho'_i\}$ are possible based at least in part on the source of delay spread or propagation delay. As an example, tower height effects on timing delay offset can lead to a non-linear relationship. As another example, the non-linear sources of delay offset such as multipath are stochastic in nature, and can result in a non-linear relationship. For example, diagram 450 in FIG. 4C illustrates a schematic histogram, at instant $\tau 404$, of position of mobile devices in set 406, while an offset schematic histogram of TOF location estimates is illustrated in diagram 475 which displays a shift of one TA band. An estimate of propagation delay offset $\Delta\tau$ can be extracted via the relationship $\Delta\rho=v\Delta\tau$, where $v$ is the propagation speed of wireless signal over the air interface. Analysis component 218 can evaluate (e.g., compute) correlation via at least one of Pearson product-moment correlation coefficient, Pearson's $\chi^2$ test, Spearman's rank correlation, or Kendall $\tau$ rank correlation coefficient. The systematic variance between the two sets of location estimates is utilized to calculate an accurate estimate of propagation delay offset through estimation of $\Delta\rho$ and extraction of $\Delta\tau$ there from. Analysis component 218 can carry out computations and extract $\Delta\tau$. Algorithms to perform such evaluation(s) or computation(s) can reside within algorithm storage 244.

(2) Calibration platform 210 exploits a first set of known locations of a set of one or more probes (e.g., wireless beacons $520_1$-$520_3$) to obtain a second set of location estimates of the known locations using "time of flight" measurements and cell or sector identifiers. Analysis component 218 utilizes the timing advance or round trip delay determined by TOF component 212 to correct the timing advance information in a position determination function (PDF) such as CGI+TA. In addition or as an alternative to statistical analysis to determine a propagation delay offset, TOF component 212 determines TA, RTT, TOA, or TDOA iteratively, upon each determination, or iteration, analysis component 218 corrects the determined TA, RTT, TOA, or TDOA based at least in part on the generated second set of location estimates. Analysis component 218 terminates the iteration cycle when magnitude of correction to TA, RTT, TOA, or TDOA is below a tolerance or threshold; the threshold can be configured by a network operator. Analysis component 218 also can terminate the iteration cycle when a predetermined metric, e.g., a loss function, that assesses quality of the generated second set of locations is below a threshold. It is noted that iterative determination of propagation delay offset(s) also can be implemented in scenario (1) described above. It should also be noted that an additional iterative loop can be effected in order to maintain calibration of timing delay, or any other calibration described herein, updated as additional location estimates become available. In an aspect, a first iterative loop can be employed for calibration, and a second iterative loop can be utilized to update extant calibration(s).

Example system 200 also can include a monitor component 219 that determines when a calibration of propagation timing offsets is to be conducted. To at least that end, monitor component 219 can execute, at least in part, a monitoring algorithm retained, for example, in memory element 244, that triggers a calibration based at least in part on a calibration protocol which can be included in calibration schedule(s) 248. Calibration protocol can configure one or more conditions that when fulfilled initiate a calibration, or calibration protocol can implement calibration continuously, or nearly continuously; e.g., as location estimates become available.

Determined signal path propagation delay offset(s) for a cell or sector can be retained in delay offset storage 246. A delay offset, or delay offset error, compensates for signal path propagation due to one or more of the propagation delay sources described above, and affords to ensure location estimates based upon TOA or TOF methods are accurate. Data management component 211 can convey, e.g., communicate, signal path propagation delay data (e.g., delay data 217) to one or more network components such as radio network controller, network gateway (e.g., GMLC) and associated serving node(s) (e.g., SMLC), or any other type of management component; a location based service network; or a service or utility network such as a network that provides, for example, enhanced 911 (E911) service. Calibration of wireless signal propagation information, or compensation of propagation delays offsets, can be implemented on at least one of a scheduled basis with a calibration schedule 225 (e.g., specific instants during a cycle such as quarter) determined by a network operator; received calibration schedule 225 can be retained in calibration schedule(s) 248. In addition, calibration can be conducted at predetermined time interval basis such as hourly, daily, monthly, etc. Moreover, calibration can be performed on an event basis, wherein an event can include a change in the wireless environment in which the wireless signal is propagated, the change can be assessed, for example, through changes in channel quality indicator(s) with respect to a threshold.

Example system 200 can include a processor 250, which is configured to confer, and confers, at least in part, the described functionality of the various components included in example system 200. Processor 250 can execute code instructions (not shown) stored in memory 240, or other memory(ies), to provide the described functionality. It should be appreciated that processor 250 can be a centralized element or be distributed among the various referenced components.

Various aspects of the subject innovation can be automated through artificial intelligence (AI) methods to infer (e.g., reason and draw a conclusion based upon a set of metrics, arguments, or known outcomes in controlled scenarios) suitable models for propagation of wireless signal, e.g., RF signal, microwave signal, etc.; optimal or near-optimal positions for probes that enable generation of accurate location estimates via TOF assessment; extraction, at least in part, of sector coverage mapping and related calibration of sector boundary bearing(s), or azimuth calibration of handset position; or the like. Artificial intelligence techniques typically apply advanced mathematical algorithms—e.g., decision trees, neural networks, regression analysis, principal component analysis (PCA) for feature and pattern extraction, cluster analysis, genetic algorithm, or reinforced learning—to a data set; e.g., the collected subscriber intelligence in the case of subscriber segmentation. In particular, one of numerous methodologies can be employed for learning from data and then drawing inferences from the models so constructed. For example, Hidden Markov Models (HMMs) and related prototypical dependency models can be employed. General probabilistic graphical models, such as Dempster-Shafer networks and Bayesian networks like those created by structure search using a Bayesian model score or approximation also can be utilized. In addition, linear classifiers, such as support vector machines (SVMs), non-linear classifiers like methods referred to as "neural network" methodologies, fuzzy logic methodologies also can be employed.

In view of the example system(s) described above, example method(s) that can be implemented in accordance with the disclosed subject matter can be better appreciated with reference to flowcharts in FIG. 6-FIG. 9. For purposes of simplicity of explanation, example methods disclosed herein are presented and described as a series of acts; however, it is to be understood and appreciated that the claimed subject matter is not limited by the order of acts, as some acts may occur in different orders and/or concurrently with other acts from that shown and described herein. For example, one or more example methods disclosed herein could alternatively be represented as a series of interrelated states or events, such as in a state diagram. Moreover, interaction diagram(s) may represent methods in accordance with the disclosed subject matter when disparate entities enact disparate portions of the methodologies. Furthermore, not all illustrated acts may be required to implement a described example method in accordance with the subject specification. Further yet, two or more of the disclosed example methods can be implemented in combination with each other, to accomplish one or more features or advantages herein described. It should be further appreciated that the example methods disclosed throughout the subject specification are capable of being stored on an article of manufacture to allow transporting and transferring such methods to computers for execution, and thus implementation, by a processor or for storage in a memory.

Figure 6:
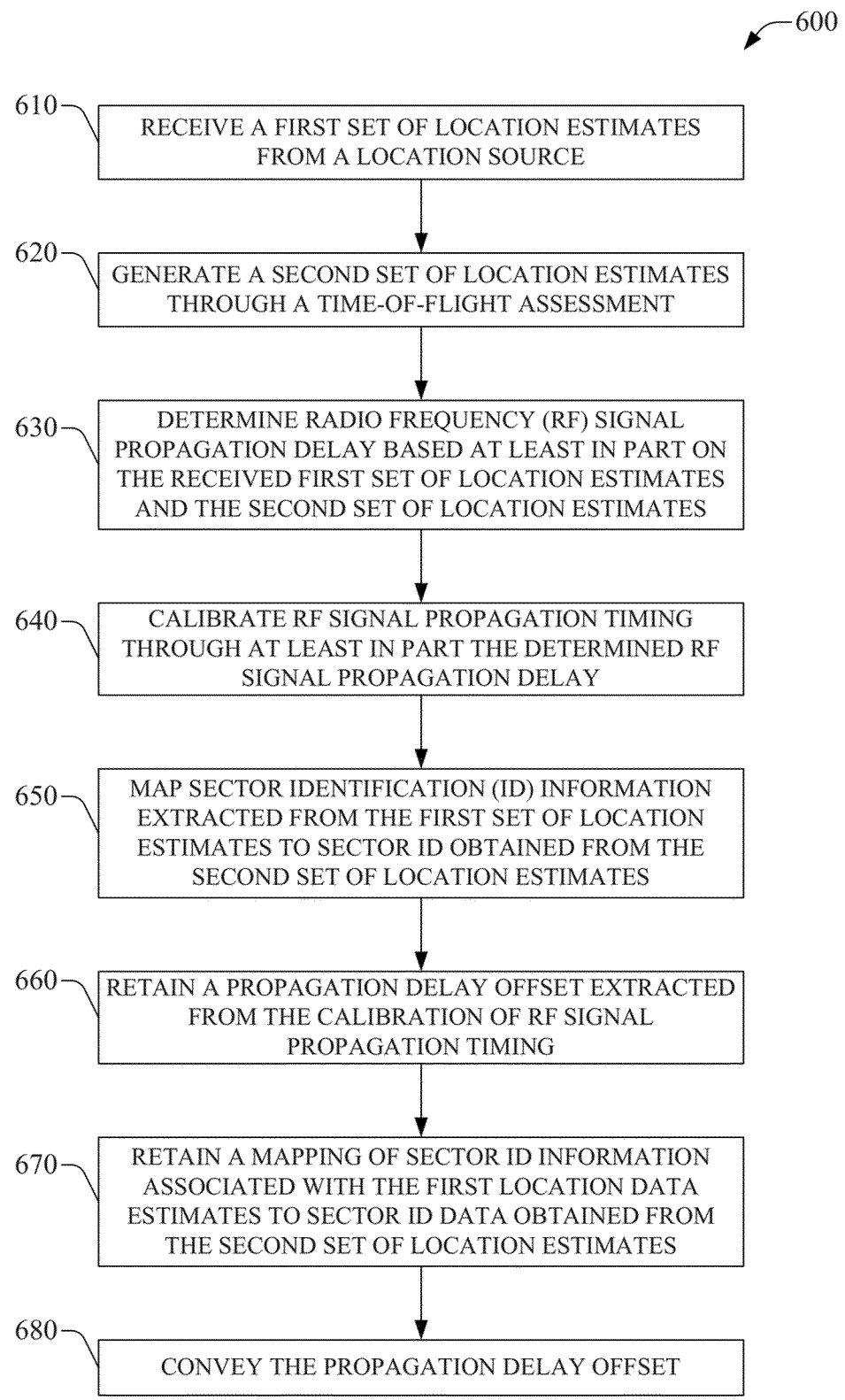
FIG. 6 presents a flowchart of an example method for compensating for radio frequency signal timing variance according to aspects described herein.

FIG. 6 presents a flowchart of an example method 600 for correcting RF propagation delay information in an operational wireless system according to aspects described herein. The subject example method 600, while illustrated for RF signal, also can be employed to correct propagation delay of electromagnetic radiation (EM) with frequencies other than radio frequency; for instance, microwave EM radiation, infrared radiation, etc. In an aspect, the subject example method 600 can be implemented by one or more network components, e.g., calibration platform 210. Alternatively or additionally, a processor (e.g., processor 250) configured to confer, and that confers, at least in part, functionality to the one or more network components can enact the subject example method 600. At act 610, a first set of location estimates from a location source is received. As described above, in an aspect, the location source can be embodied in one or more mobile handsets that support reception of GNSS data, such as assisted GPS (AGPS), and operation thereon (e.g., injection of GNSS data on location based applications that execute externally, or are native, to the mobile) or manipulation thereof such as delivery of location data. In an aspect, the first set of location estimates can be received at predetermined instants (e.g., τ404) or time intervals that can be configured by a network operator. Additionally, received location estimates can be accumulated for a specific interval time interval (e.g., a second, a minute . . . ) that also can be configured by a network operator.

In another aspect, the location source can be embodied in a network component that retains known location, or deployment, records of a set of one or more probes, or wireless beacons (e.g., probes $520_1$-$520_3$). As an example, the wireless beacons can be Wi-Fi outdoor access points that are part of a public metropolitan network. At act 620, a second set of location estimates is generated through a TOF assessment. Such assessment can be based at least in part on at least one of CGI+TA, CGI+RTT, RL-TOA, RL-TDOA, FL-TOA, FL-TDOA, O-TDOA, or AOA. In an aspect, the second set of location estimates is generated in response to receiving the first set of location estimates. In another aspect, the set of one or more probes, or wireless beacons, at known positions can be utilized to generate the second set of location estimates via a time of flight method. It is noted that a model utilized for RF signal propagation, or propagation of any EM radiation, in the wireless environment can affect the generation of locations through the TOF assessment. Accordingly, based at least on conditions in a wireless environment or changes thereof, e.g., foliage changes, landscape changes such as skyline changes, atmospheric conditions, which can affect absorption of propagated radiation and other scattering properties thereof, different wireless signal propagation models can be employed to generate the second set of location estimates.

It should be appreciated that the first set of location estimates and the second set of location estimates correspond to at least one of the same ground truth or two disparate ground truths spaced by a known location offset, such as a position with respect to a landmark. It should further be appreciated that location estimates can allow extraction of angular, or azimuth, position within a sector or cell. Thus, location estimates can provide location information within portions, or tiles (e.g., $403_A$-$403_D$), within a sector.

At act 630, RF signal propagation delay is determined based at least in part on the received first set of location estimates and the generated second set of location estimates. In an aspect, statistical analysis of the data, e.g., received location estimates and generated location estimates, is utilized to establish a correlation between the first set of location estimates and the second set of location estimates. Such correlation evaluates a degree of linear dependency, or co-linearity, among the first set and second set of location estimates. Correlation can be quantified through the Pearson product-moment correlation coefficient. It should be appreciated that other statistical metrics also can be employed to quantify a correlation among the first set of location estimates and the second set of location estimates such as Pearson's $\chi^2$ test, Spearman's rank correlation, or Kendall τ rank correlation coefficient. Systematic variance between the two sets of location estimates and variance of either set of location estimates are employed to calculate an accurate estimate of RF signal propagation delay.

In another aspect, RF signal propagation delay is iteratively determined by refining the location estimates in the generated second set of location estimates. Refinement includes iterative correction of RF signal propagation delay in order to produce TA, or timing delay, data that is consistent with the known locations in the first set of location estimates. A tolerance or threshold can determine when the iterative corrections have converged, or yielded location estimates consistent with location in the first set of estimates.

It is noted that angular, or azimuth, information provided through the first set of location estimates and the generated second set of location estimates can enable determination of RF signal propagation delay, and compensation thereof, within specific portions or geographic tiles within a cell or sector.

At act 640, RF signal propagation timing is calibrated via at least in part the determined RF signal propagation delay. It is noted that calibration of RF signal propagation timing can be produced for one or more portions or tiles (e.g., $404_A$-$403_D$) within a cell or sector. At act 650, sector identification (ID) information extracted from the first set of location estimates is mapped to sector ID data obtained from the second set of location estimates. Such mapping enables generation of effective coverage pattern of sectors in deployed cells. It is noted that the effective coverage pattern is affected by substantially the same, or the same, wireless environment conditions described supra. It is further noted that the mapping also can include determining angular, azimuth, boundaries within a sector that enable, in conjunction with RTT or TA bands, determination of geographic tiles within an identified sector.

At act 660, a propagation delay offset extracted from the calibration of the RF signal propagation timing is retained (e.g., in memory 240). At act 670, a mapping of sector ID information associated with the first location data estimates to sector ID data obtained from sector ID data obtained from the second set of location estimates is retained. The mapping can provide a network operator with actual, field features of sectorization intelligence that can allow detailed planning of cell deployment, antenna technology employed for communication, and frequency reuse. In an aspect, the mapping is stored in a memory element such as location intelligence storage 242.

At act 680, the propagation delay offset is conveyed. For example, the propagation delay offset can be delivered, for example, to at least one of one or more components in a radio access network, one or more components in a location service(s) network such as E911, tracking of individuals (e.g., children) or products, etc.; or one or more components in a utility network, such as wireless-enabled and wide-area-network-enabled meters in a smart grid.

It is noted that the subject example method 600 can be employed for compensation of RF signal propagation delay in various operational wireless system such as macro coverage wireless systems; radar systems; home-based wireless systems, e.g., micro cell, pico cell, femtocell, Wi-Fi hot spot; or the like. It should be appreciated that for the various aforementioned wireless technologies, propagation of RF signal(s), microwave signal(s), infrared signal(s), or any other radiation signal(s), is implemented by a radio communication component, e.g., signaling and traffic component 234, that can reside within an access point that operates in accordance with a respective wireless technology.

Figure 7:
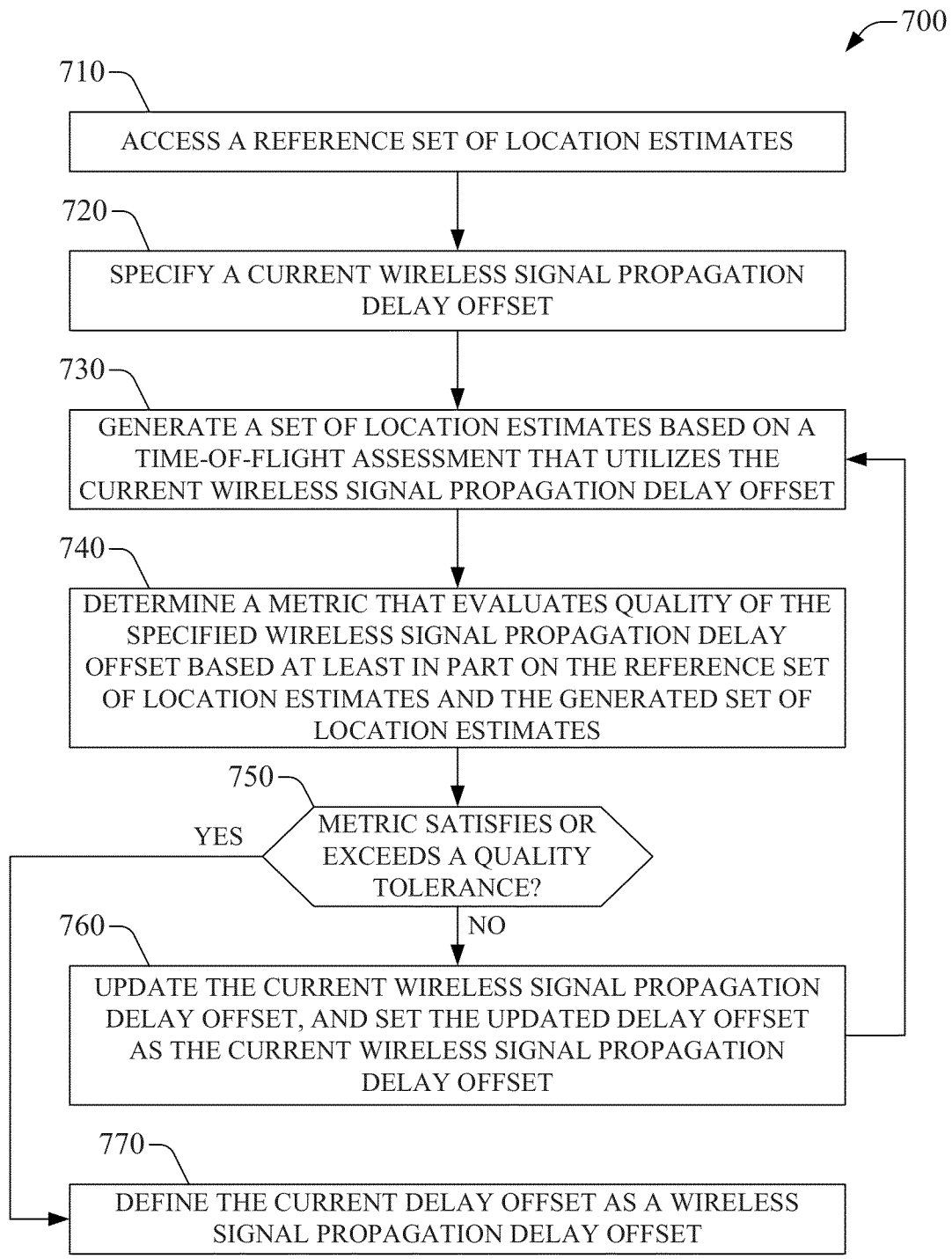
FIG. 7 is a flowchart of an example method for iteratively generating a propagation delay offset in according to aspects of the subject innovation.

FIG. 7 is a flowchart of an example method 700 for iteratively generating a propagation delay offset in according to aspects of the subject innovation. The subject example method 700 can be implemented by one or more network components, e.g., calibration platform 210. Alternatively or additionally, a processor (e.g., processor 250) configured to confer, and that confers, at least in part, functionality to the one or more network components can enact the subject example method 700. At act 710, a reference set of location estimates is accessed. The reference set can be retrieved from a network management component (e.g., a radio network controller, a network gateway (e.g., GMLC) or associated serving node (SMLC) . . . ) or it can be received there from as a part of a propagation delay calibration protocol (e.g., example method 600). At act 720, a current wireless signal (e.g., RF signal) propagation delay offset is specified. Specification can be based, in an aspect, on a previously established delay offset, which can be retrieved from a data storage (e.g., delay offset storage). At act 730, a set of location estimates based on a time-of-flight assessment that utilizes the current wireless signal propagation delay offset is generated. Utilization can include correction of a detected time of flight, e.g., TOA or RTT, with the current delay offset.

At act 740, a metric that evaluates quality of the specified, current wireless signal propagation delay offset based at least in part on the reference set of location estimates and the generated set of location estimates. In an aspect, the metric can be a loss function L that assesses disparity among generated location estimates and reference location data; as an illustration, L can be one of $L=\Sigma(\rho_i^{(ref)}-\rho_i^{(gen)})^2$, $L=\Sigma|\rho_i^{(ref)}-\rho_i^{(gen)}|$, or a combination thereof (e.g., Huber loss function), where summation over integer index i is performed over the full set of reference (ref) location estimates $\rho_i^{(ref)}$ and generated (gen) location estimates $\rho_i^{(gen)}$. At act 750, it is evaluated whether the metric satisfies or exceeds a quality tolerance; e.g., $L \le L_0$, where $L_0$ is the quality tolerance, which can be configurable and can be determined by a network operator. In the negative case, at act 760, the current wireless signal propagation delay offset is updated, and the updated delay offset is set as the current wireless signal propagation delay offset. In an aspect, update or refinement of the current delay offset can be effected through adaptive-step corrections δt to propagation delay, with larger correction(s) on early steps in the update or refinement, and smaller correction(s) δt' at later steps. It should be appreciated that conventional approaches to mitigate instabilities in convergence can be applied to the update of the current delay offset. After updating the current delay offset, flow is directed to act 730. In the affirmative case, when the metric satisfies or exceeds the quality tolerance, at act 770, a wireless signal propagation delay offset is defined as the current delay offset.

It is noted that an iterative loop additional to the subject example methodology can be effected in order to maintain calibration(s) of timing delay, or any other calibration described herein, updated as additional location data becomes available. In an aspect, the subject example method 700 can embody a first iterative loop employed for a calibration, and a second iterative loop that exploits example method 700 can update the calibration. As an example, the second iterative loop can be employed to account for changes to a calibration that can result from changes in wireless environment such as new building construction, seasonal changes, or the like.

Figure 8:
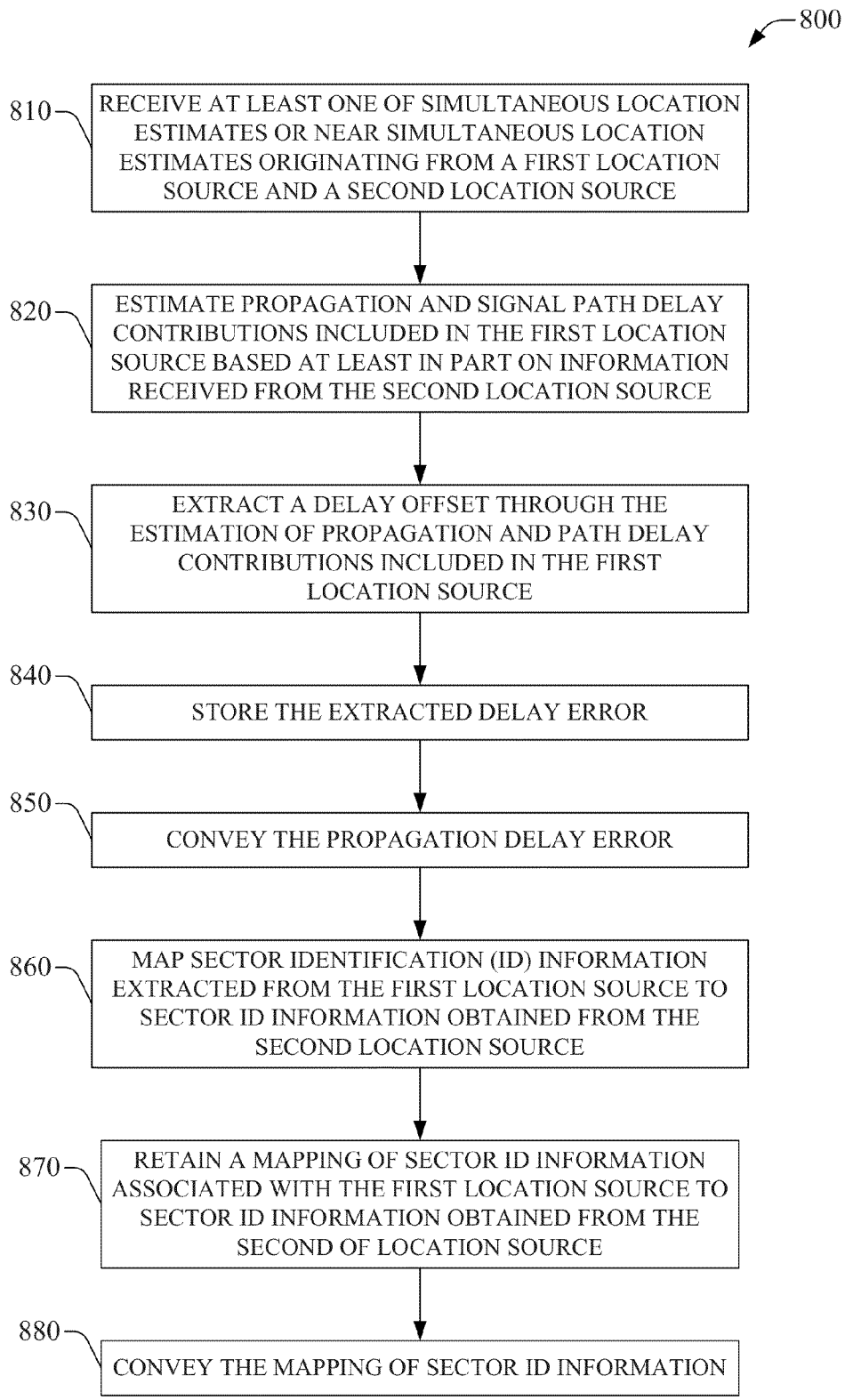
FIG. 8 presents a flowchart of an example method for generating a propagation delay error for propagation of a wireless signal according to aspects of the innovation described herein.

FIG. 8 presents a flowchart of an example method 800 for generating a propagation delay error for propagation of a wireless signal according to aspects of the innovation described herein. The subject example method 800 can be implemented by one or more network components, e.g., calibration platform 210. Alternatively or additionally, a processor (e.g., processor 250) configured to confer, and that confers, at least in part, functionality to the one or more network components can enact the subject example method 800. At act 810, at least one of simultaneous location estimates or near-simultaneous location estimates originating from a first location source and a second location source are received. The first source can be one of a collection of location estimates produced through a high-accuracy location mechanism or a collection of location estimates generated via a TOA location mechanism. The second source is one of the collection of location estimates produced through the high-accuracy location mechanism or the collection of location estimates generated via the TOA location mechanism. The first source is disparate from the second source with respect to location function. However, it is noted that the first source and the second source provide substantially simultaneous location estimates for a common ground truth. Alternatively or additionally, the first source and the second source allow, at least in part, determination of a location estimate for the same ground truth. Moreover, it is noted that the source of high-accuracy location estimates is independent of the source of location estimates based at least in part on TOA, for which the delay offset is compensated as described herein; no adjustments or corrections are effected to locations estimates originating from the high-accuracy source. In an aspect, the high-accuracy location mechanism is a calibrated mechanism, and the TOA, or TOF, location mechanism includes at least one of the following mechanisms: RL-TDOA, RL-TOA, FL-TOA, FL-TDOA, observed TOA (O-TOA), CGI+RTT, or CGI+TA.

At act 820, propagation delay and signal path delay contributions included in the first location source based at least in part on information received from the second location source. At act 830, a delay error is extracted through the estimation of propagation and path delay contributions included in the first location source. It is noted that angular, or azimuth, location information provided through the first set of location estimates and the generated second set of location estimates can enable determination of propagation delay for specific angles with respect to the centerline between a receiver RL and an emitter FL, and specific portions or geographic tiles within a cell or sector. At act 840, the extracted delay error is stored. Retaining the delay error can provide an initial value to a method or mechanism for calibrating propagation and signal path delay when propagation conditions in a wireless environment change and further delay calibration can be necessary. At act 850, the propagation delay error is conveyed. In an aspect, the extracted delay error can be transmitted in delay data 217 to, for example, at least one of one or more components in a radio access network, one or more components in a location service(s) network such as E911, tracking of individuals (e.g., children) or products, etc.; or one or more components in a utility network, such as a smart meter in a smart energy grid.

At act 860, sector ID information extracted from the first location source is mapped to sector ID information obtained from the second location source. Such mapping can enable calibration of sector bearing, e.g., location of a handset that operates within an identified sector with respect to the centerline between the receiver RL and the emitter FL antenna. At act 870, a mapping of sector ID information associated with the first location source to sector ID information obtained from the second location source is retained; for instance, the mapping can be retained in location intelligence storage 242. At act 880, the mapping of sector ID information is conveyed. In an aspect, the conveyed mapping can be utilized by network planning tools for cell deployment and design, and radio resource(s) allocation as well. As an example, the mapping can be included and delivered within delay data 217.

Figure 9:
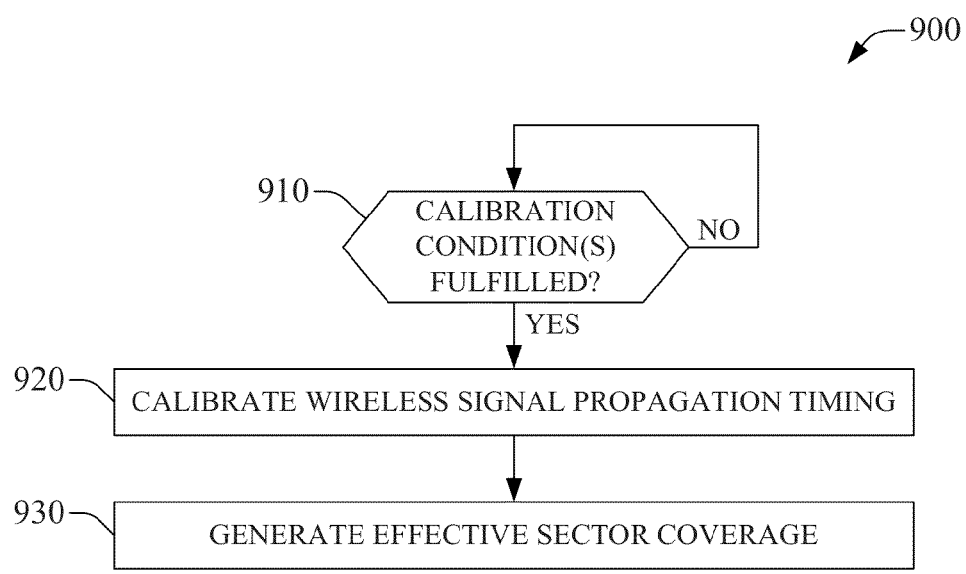
FIG. 9 is flowchart of a method for initiating a calibration of wireless signal propagation timing in accordance with aspects described herein.

FIG. 9 is flowchart of a method for initiating a calibration of wireless signal propagation timing in accordance with aspects described herein. The subject example method 900 can be implemented by one or more network components, e.g., calibration platform 210. Alternatively or additionally, a processor (e.g., processor 250) configured to confer, and that confers, at least in part, functionality to the one or more network components can enact the subject example method 900. Further, a monitor component, e.g., a monitoring device (e.g., a processor and a memory functionally coupled thereto through a bus) that can be part of calibration platform 210, and executes a monitoring application, can implement the subject method 900. At act 910, network operation conditions are evaluated to determine if one or more operation conditions that warrant timing delay calibration, e.g., calibration conditions, are fulfilled. Such calibration conditions can be retained in a calibration protocol, which dictates circumstance(s) under which a timing delay calibration is to be conducted; e.g., calibration is conducted when (i) maintenance or substantially any repairs are performed to radio component(s) in a base station; (ii) additional reference positions of wireless beacons become available; (iii) landscape, skyline, or housing density is altered; (iv) foliage or other scattering elements such as moving vehicles changes density, e.g., climate season change, vehicular traffic change at rush hour in a sector in the vicinity of a highway, etc.; or the like. Alternatively or additionally, calibration protocol can establish a continuous, or nearly continuous, calibration process in which each new available pair of location estimates for a ground truth triggers a timing-delay calibration update and associated generated of an updated timing delay offset. In an aspect, calibration update can exploit a data aging or data update approach to effect the calibration updated in view of the new available data. In an aspect, calibration updates can be employed to account for changes to a calibration that can result from changes in wireless environment such as new building construction, seasonal changes, and the like. When outcome of act 910 is negative, monitoring continues. Conversely, at act 920, wireless signal propagation timing is calibrated. Calibration can be conducted as a function of range or angular, or azimuth, position within a sector. At act 930, effective sector coverage is generated as part of calibration of wireless signal propagation timing through range and angular calibration. It should be appreciated that factors that determine, at least in part, effective total timing delay(s) of wireless signal(s) also dictate, at least in part, sector boundaries and effective sectorization pattern(s). Thus, in an aspect, calibration of wireless signal propagation timing and genera-tion of effective sectorization patterns can be conducted simultaneously, or nearly simultaneously.

Figure 10:
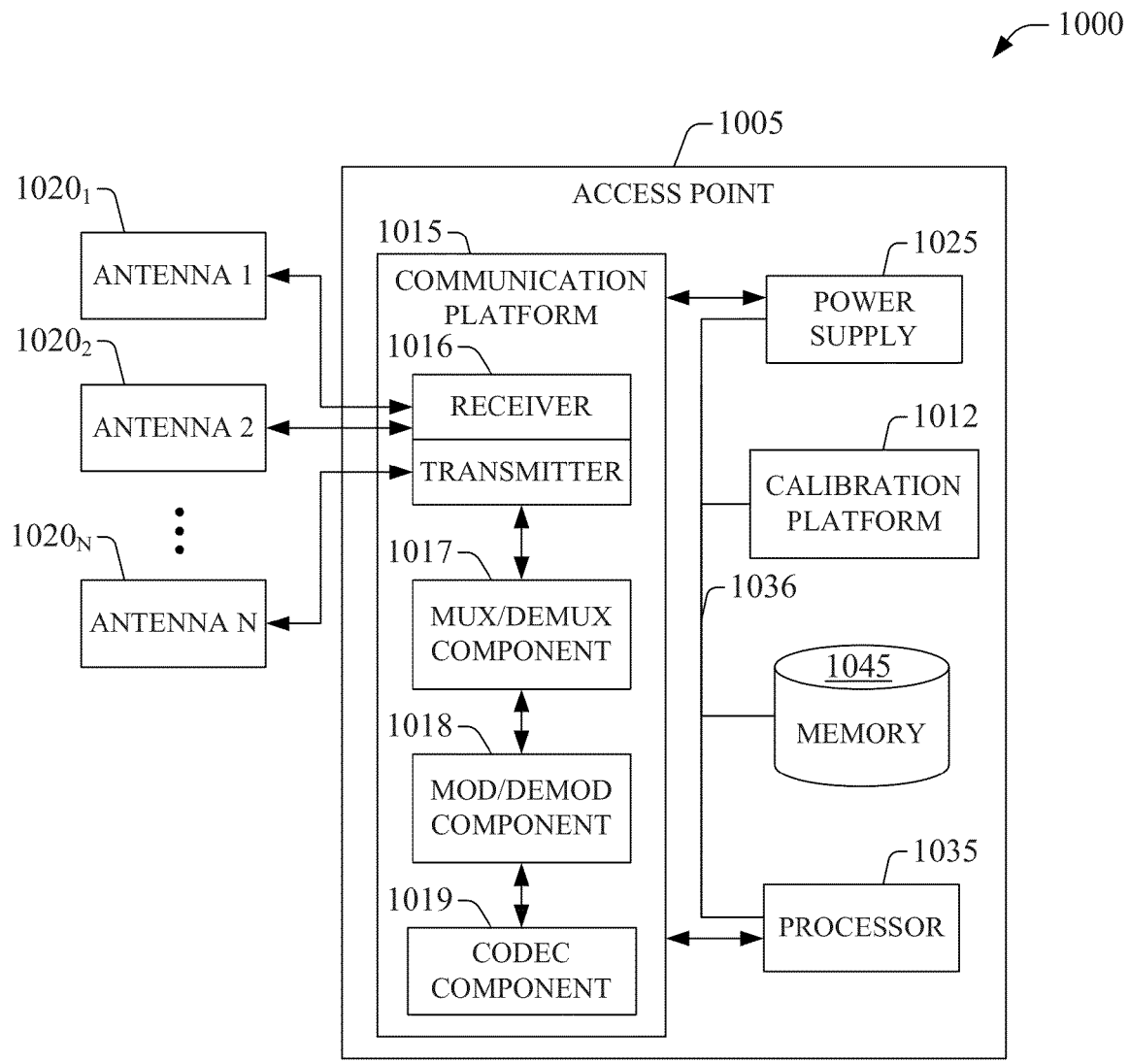
FIG. 10 illustrates a block diagram of an example embodiment of an access point to implement and exploit one or more features or aspects of the subject innovation.

FIG. 10 illustrates a block diagram of an example embodiment of an access point to implement and exploit one or more features or aspects of the subject innovation. In embodiment 1000, AP 1005 can receive and transmit signal(s) (e.g., attachment signaling) from and to wireless devices like femto access points, access terminals, wireless ports and routers, or the like, through a set of antennas $1020_1$-$1020_N$ (N is a positive integer). It should be appreciated that antennas $1020_1$-$1020_N$ embody antenna(s) 232, and are a part of communication platform 1015, which comprises electronic components and associated circuitry that provides for processing and manipulation of received signal(s) and signal(s) to be transmitted. Such electronic components and circuitry embody at least in part signaling and traffic component 234; communication platform 1015 operates in substantially the same manner as communication platform 230 described hereinbefore.

In an aspect, communication platform 1015 includes a receiver/transmitter 1016 that can convert signal (e.g., RL signal 238) from analog to digital upon reception, and from digital to analog upon transmission. In addition, receiver/transmitter 1016 can divide a single data stream into multiple, parallel data streams, or perform the reciprocal operation. Coupled to receiver/transmitter 1016 is a multiplexer/demultiplexer 1017 that facilitates manipulation of signal in time and frequency space. Electronic component 1017 can multiplex information (data/traffic and control/signaling) according to various multiplexing schemes such as time division multiplexing (TDM), frequency division multiplexing (FDM), orthogonal frequency division multiplexing (OFDM), code division multiplexing (CDM), space division multiplexing (SDM). In addition, mux/demux component 1017 can scramble and spread information (e.g., codes) according to substantially any code known in the art; e.g., Hadamard-Walsh codes, Baker codes, Kasami codes, polyphase codes, and so on. A modulator/demodulator 1018 is also a part of communication platform 1015, and can modulate information according to multiple modulation techniques, such as frequency modulation, amplitude modulation (e.g., M-ary quadrature amplitude modulation (QAM), with M a positive integer), phase-shift keying (PSK), and the like. Communication platform 1015 also includes a coder/decoder (codec) component 1019 that facilitates decoding received signal(s), and coding signal(s) to convey.

Access point 1005 also includes a processor 1035 configured to confer functionality, at least in part, to substantially any electronic component in AP 1005. In particular, processor 1035 can facilitate determination of propagation delay information of RF signal, or microwave signal, between communication platform 1015 and antennas $1020_1$-$1020_N$ in accordance with various aspects and embodiments disclosed herein. Power supply 1025 can attach to a power grid and include one or more transformers to achieve power level that can operate AP 1005 components and circuitry. Additionally, power supply 1025 can include a rechargeable power component to ensure operation when AP 1005 is disconnected from the power grid, or in instances, the power grid is not operating. AP 1005 also includes a network interface (not shown) that allows connection to backhaul link(s) and other link(s) that enable operation of the access point.

Processor 1035 also is functionally connected to communication platform 1015 and can facilitate operations on data (e.g., symbols, bits, or chips) for multiplexing/demultiplexing, such as effecting direct and inverse fast Fourier transforms, selection of modulation rates, selection of data packet formats, inter-packet times, etc. Moreover, processor 1035 is functionally connected, via a data or system bus 1036, to calibration platform 1012 and other components of AP 1005 to confer, at least in part functionality to each of such platform and components. It should be appreciated that while calibration platform 1012 is illustrated as residing within access point 1005, at least a portion of the functionality of calibration platform 1012 can be enabled by one or more network components, existing of purpose-built node(s). For instance, at least part of the functionality of calibration component 1012 can be afforded through a serving mobile location center (SMLC) within a base station controller.

In AP 1005, memory 1045 can store data structures, code instructions and program modules, system or device information, code sequences for scrambling, spreading and pilot transmission, location intelligence storage, determined delay offset(s), over-the-air propagation models, and so on. Processor 1035 is coupled to the memory 1045 in order to store and retrieve information necessary to operate and/or confer functionality to communication platform 1015, calibration platform 1012, and other components (not shown) of access point 1005.

Figure 11:
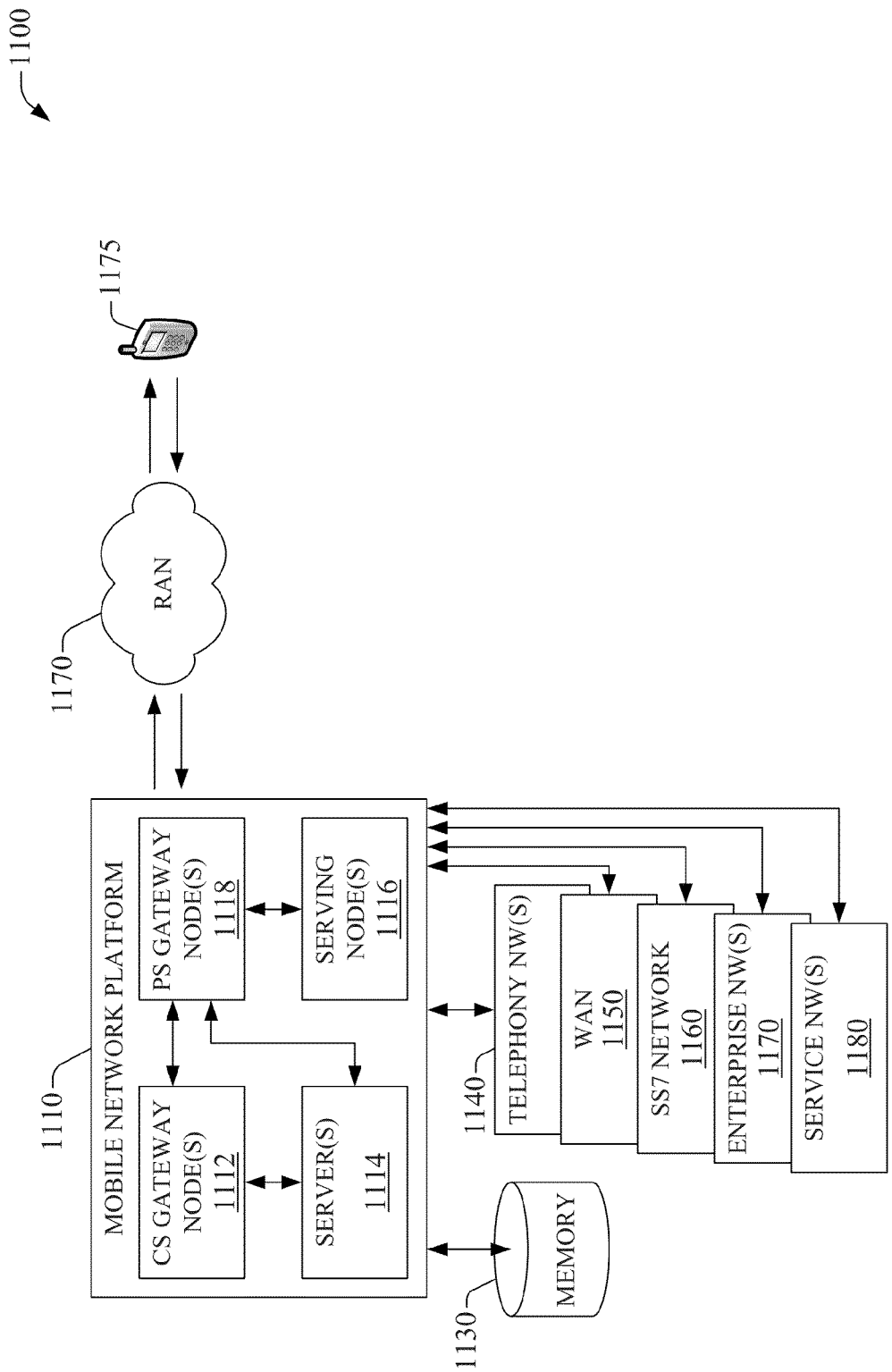
FIG. 11 is a block diagram of an example embodiment of a mobile network platform to implement and exploit various features or aspects of the subject innovation.

FIG. 11 presents an example embodiment 1100 of a mobile network platform 1110 that can implement and exploit one or more aspects of the subject innovation described herein. Generally, wireless network platform 1110 can include components, e.g., nodes, gateways, interfaces, servers, or disparate platforms, that facilitate both packet-switched (PS) (e.g., internet protocol (IP), frame relay, asynchronous transfer mode (ATM)) and circuit-switched (CS) traffic (e.g., voice and data), as well as control generation for networked wireless telecommunication. Mobile network platform 1110 can communicate with a mobile device 1175 through a RAN 1170. Mobile network platform 1110 includes CS gateway node(s) 1112 which can interface CS traffic received from legacy networks like telephony network(s) 1140 (e.g., public switched telephone network (PSTN), or public land mobile network (PLMN)) or a signaling system #7 (SS7) network 1170. Circuit switched gateway node(s) 1112 can authorize and authenticate traffic (e.g., voice) arising from such networks. Additionally, CS gateway node(s) 1112 can access mobility, or roaming, data generated through SS7 network 1170; for instance, mobility data stored in a visited location register (VLR), which can reside in memory 1130. Moreover, CS gateway node(s) 1112 interfaces CS-based traffic and signaling and PS gateway node(s) 1118. As an example, in a 3GPP UMTS network, CS gateway node(s) 1112 can be realized at least in part in gateway GPRS support node(s) (GGSN). It should be appreciated that functionality and specific operation of CS gateway node(s) 1112, PS gateway node(s) 1118, and serving node(s) 1116, is provided and dictated by radio technology(ies) utilized by mobile network platform 1110 for telecommunication.

In the subject innovation, in addition to receiving and processing CS-switched traffic and signaling, PS gateway node(s) 1118 can authorize and authenticate PS-based data sessions with served mobile devices. Data sessions can include traffic, or content(s), exchanged with networks external to the wireless network platform 1110, like wide area network(s) (WANs) 1150, enterprise network(s) 1170, and service network(s) 1180, which can be embodied in local area network(s) (LANs), can also be interfaced with mobile network platform 1110 through PS gateway node(s) 1118. It is to be noted that WANs 1150 and enterprise network(s) 1160 can embody, at least in part, a service network(s) like IP multimedia subsystem (IMS). Based on radio technology layer(s) available in technology resource(s) 1117, packet-switched gateway node(s) 1118 can generate packet data protocol contexts when a data session is established; other data structures that facilitate routing of packetized data also can be generated. To that end, in an aspect, PS gateway node(s) 1118 can include a tunnel interface (e.g., tunnel termination gateway (TTG) in 3GPP UMTS network(s) (not shown)) which can facilitate packetized communication with disparate wireless network(s), such as Wi-Fi networks.

In embodiment 1100, wireless network platform 1110 also includes serving node(s) 1116 that, based upon available radio technology layer(s) within technology resource(s) 1117, convey the various packetized flows of data streams received through PS gateway node(s) 1118. It is to be noted that for technology resource(s) 1117 that rely primarily on CS communication, server node(s) can deliver traffic without reliance on PS gateway node(s) 1118; for example, server node(s) can embody at least in part a mobile switching center. As an example, in a 3GPP UMTS network, serving node(s) 1116 can be embodied in serving GPRS support node(s) (SGSN).

For radio technologies that exploit packetized communication, server(s) 1114 in mobile, or wireless, network platform 1110 can execute numerous applications (e.g., location services, online gaming, wireless banking, wireless device management . . . ) that can generate multiple disparate packetized data streams or flows, and manage (e.g., schedule, queue, format . . . ) such flows. Such application(s) can include add-on features to standard services (for example, provisioning, billing, customer support . . . ) provided by wireless network platform 1110, or at least a portion of location PDFs. Data streams (e.g., content(s) that are part of a voice call or data session) can be conveyed to PS gateway node(s) 1118 for authorization/authentication and initiation of a data session, and to serving node(s) 1116 for communication thereafter. In addition to application server, server(s) 1114 can include utility server(s), a utility server can include a provisioning server, an operations and maintenance server, a security server that can implement at least in part a certificate authority and firewalls as well as other security mechanisms, and the like. In an aspect, security server(s) secure communication served through wireless network platform 1110 to ensure network's operation and data integrity in addition to authorization and authentication procedures that CS gateway node(s) 1112 and PS gateway node(s) 1118 can enact. Moreover, provisioning server(s) can provision services from external network(s) like networks operated by a disparate service provider; for instance, wide area network (WAN) 1150 or Global Positioning System (GPS) network(s) (not shown). Provisioning server(s) can also provision coverage through networks associated to wireless network platform 1110 (e.g., deployed and operated by the same service provider), such as femtocell network(s) (not shown) that enhance wireless service coverage within indoor confined spaces and offload RAN 1170 resources in order to enhance subscriber service experience within a home or business environment. Server(s) 1114 can embody, at least in part, calibration platform 210 and any component(s) therein.

It is to be noted that server(s) 1114 can include one or more processors configured to confer at least in part the functionality of macro network platform 1110. To that end, the one or more processor can execute code instructions stored in memory 1130, for example. It is should be appreciated that server(s) 1114 can include at least a portion of at least one of calibration component 210, location source(s) platform 220, or network management component 550, which operates in substantially the same manner as described hereinbefore.

In example embodiment 1100, memory 1130 can store information related to operation of wireless network platform 1110. In particular, memory 1130 can include contents of memory 240 in example system 200. Other operational information can include provisioning information of mobile devices served through wireless platform network 1110, subscriber databases; application intelligence, pricing schemes, e.g., promotional rates, flat-rate programs, couponing campaigns; technical specification(s) consistent with telecommunication protocols for operation of disparate radio, or wireless, technology layers; and so forth. Memory 1130 can also store information from at least one of telephony network(s) 1140, WAN 1150, enterprise network(s) 1170, or SS7 network 1160.

It is to be noted that aspects, features, or advantages of the subject innovation described in the subject specification can be exploited in substantially any wireless communication technology. For instance, Wi-Fi, WiMAX, Enhanced GPRS, 3GPP LTE, 3GPP2 UMB, 3GPP UMTS, HSPA, HSDPA, HSUPA,GERAN, UTRAN, LTE Advanced. Additionally, substantially all aspects of the subject innovation as disclosed in the subject specification can be exploited in legacy telecommunication technologies; e.g., GSM. In addition, mobile as well non-mobile networks (e.g., internet, data service network such as internet protocol television (IPTV)) can exploit aspects or features described herein.

Various aspects or features described herein can be implemented as a method, apparatus or system, or article of manufacture using standard programming or engineering techniques. In addition, various aspects or features disclosed in the subject specification also can be effected through program modules that implement at least one or more of the methods disclosed herein, the program modules being stored in a memory and executed by at least a processor. Other combinations of hardware and software or hardware and firmware can enable or implement aspects described herein, including disclosed method(s). The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical discs (e.g., compact disc (CD), digital versatile disc (DVD), blu-ray disc (BD) . . . ), smart cards, and flash memory devices (e.g., card, stick, key drive . . . ).

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

By way of illustration, and not limitation, nonvolatile memory can include read only memory (ROM), programmable ROM (PROM), electrically programmable ROM (EPROM), electrically erasable ROM (EEPROM), or flash memory. Volatile memory can include random access memory (RAM), which acts as external cache memory. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), and direct Rambus RAM (DRRAM). Additionally, the disclosed memory components of systems or methods herein are intended to comprise, without being limited to comprising, these and any other suitable types of memory.

What has been described above includes examples of systems and methods that provide advantages of the subject innovation. It is, of course, not possible to describe every conceivable combination of components or methodologies for purposes of describing the subject innovation, but one of ordinary skill in the art may recognize that many further combinations and permutations of the claimed subject matter are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

What is claimed is:

1. A method, comprising:
 determining, by a system comprising a processor, first location estimate data indicative of a first set of location estimates associated with a location and second location estimate data indicative of a second set of location estimates associated with the location, wherein the first set of location estimates and the second set of location estimates are determined based on different location assessment techniques;
 mapping, by the system, first sector identification data determined from the first location estimate data with second sector identification data determined from the second location estimate data; and
 based on the mapping, calibrating, by the system, sector bearing data that represents a position of a user equipment within a defined sector of an access point device, with respect to a centerline determined between a receiver antenna and an emitter antenna of the access point device.

2. The method of claim 1, further comprising:
 determining, by the system, propagation delay offset data based on a correlation between first location estimate data and the second location estimate data, wherein the determining the propagation delay offset data comprises determining the propagation delay offset data based on a determination of a degree to which the first set of location estimates are linearly related to the second set of location estimates; and
 based on the propagation delay offset data, calibrating, by the system, a propagation timing measurement associated with a wireless signal based on the propagation delay offset data.

3. The method of claim 1, further comprising:
selecting, by the system, model data indicative of a propagation model that facilitates a determination of the first set of location estimates.

4. The method of claim 1, wherein the determining comprises determining, the first set of location estimate data based on time-of-flight measurement data associated with a wireless signal transmitted between the access point device and the user equipment.

5. The method of claim 1, further comprising:
based on the calibrating, determining, by the system, timing delay error data indicative of disparate timing delay errors for respective portions of the sector.

6. The method of claim 1, wherein the calibrating comprises compensating for disparate degrees of multipath effects in disparate sections of the sector.

7. The method of claim 1, wherein the mapping comprises mapping first pilot code sequence data determined from the first location estimate data with second pilot code sequence data determined from the second location estimate data.

8. The method of claim 1, further comprising:
determining, by the system, the second set of location estimates based on global positioning system data.

9. The method of claim 1, further comprising:
determining, by the system, the second set of location estimates based on global navigation satellite system data.

10. The method of claim 1, further comprising:
determining, by the system, the second set of location estimates based on network planning data.

11. A system, comprising:
a memory to store executable instructions; and
a processor coupled to the memory that facilitates execution of the executable instructions to perform operations, comprising:
determining first location estimate data and second location estimate data, wherein the first location estimate data is generated based on a first estimation of a location of a device and the second location estimate data is generated based on a second estimation of the location of the device,
determining first sector identification data based on the first location estimate data and second sector identification data based on the second location estimate data; and
based on mapping the first sector identification data with the second sector identification data, adjusting a sector bearing that represents the location within a defined sector of an access point device, with respect to a centerline between a receiver antenna and an emitter antenna of the access point device.

12. The system of claim 11, wherein the operations further comprise:
determining angular information associated with the first location estimate data and the second location estimate data, and
based on the angular information, updating wireless propagation timing measurement data.

13. The system of claim 11, wherein the device is an access point device and the operations further comprise:
receiving the first location estimate data associated with the access point device from a network data store.

14. The system of claim 13, wherein the access point device comprises a pseudo-stationary access point device and wherein the receiving comprises receiving the first location estimate data in response to a change in the location of the access point device.

15. The system of claim 11, wherein the second location estimate data is determined based on time-of-flight measurement data associated with a signal transmitted between a base station device and the device.

16. A computer-readable storage device comprising executable instructions that, in response to execution, cause a system comprising a processor to perform operations, comprising:
correlating a first set of location estimates and a second set of location estimates that are associated with a common location, wherein the first set of location estimates and the second set of location estimates are determined based on different location assessments;
mapping first sector identification data determined from the first location estimate data with second sector identification data determined from the second location estimate data; and
based on the mapping, determining sector bearing data that represents a position of a user equipment within a defined sector of an access point device, with respect to a determined centerline between a receiver antenna and an emitter antenna of the access point device.

17. The computer-readable storage device of claim 16, wherein the correlating comprises determining a variance between the first set of location estimates and the second set of location estimates.

18. The computer-readable storage device of claim 16, wherein the operations further comprise:
based on the sector bearing data, determining timing delay error data indicative of disparate timing delay errors for respective portions of the sector.

19. The computer-readable storage device of claim 16, wherein the operations further comprise:
based on the sector bearing data, compensating for disparate degrees of multipath effects in disparate sections of the sector.

20. The computer-readable storage device of claim 16, wherein the first sector identification data comprises first pilot code sequence data and the second sector identification data comprises second pilot code sequence data.

* * * * *